United States Patent [19]

Michalczyk et al.

[11] Patent Number: 5,726,247

[45] Date of Patent: Mar. 10, 1998

[54] FLUOROPOLYMER NANOCOMPOSITES

[75] Inventors: Michael Joseph Michalczyk, Wilmington, Del.; Kenneth George Sharp, Landenburg, Pa.; Charles Winfield Stewart, Newark, Del.

[73] Assignee: E. I. du Pont de Nemours and Company, Wilmington, Del.

[21] Appl. No.: 663,821

[22] Filed: Jun. 14, 1996

Related U.S. Application Data

[60] Provisional application No. 60/000,571, Jun. 28, 1995, and provisional application No. 60/002,054, Aug. 9, 1995.

[51] Int. Cl.$^6$ .................. C08K 5/51; C08L 27/12
[52] U.S. Cl. .............. 525/102; 525/104; 525/326.2; 525/326.1; 525/90; 428/421; 428/422
[58] Field of Search .................. 525/104, 102, 525/326.2, 326.4; 428/421, 422

[56] References Cited

U.S. PATENT DOCUMENTS

| | | | |
|---|---|---|---|
| 4,652,663 | 3/1987 | Takago et al. | 549/215 |
| 5,180,845 | 1/1993 | Higley | 556/445 |
| 5,252,654 | 10/1993 | David et al. | 524/414 |
| 5,274,159 | 12/1993 | Pellerite et al. | 556/485 |
| 5,412,016 | 5/1995 | Sharp | 524/430 |
| 5,459,198 | 10/1995 | Sharp | 525/102 |

FOREIGN PATENT DOCUMENTS

| | | | |
|---|---|---|---|
| 707 393 | 6/1941 | Germany. | |
| 93/23348 | 11/1993 | WIPO | C04B 41/50 |

OTHER PUBLICATIONS

Doyle, W. F. et al. and Uhlmann, D. R., *Ultrastructure Processing of Advanced Ceramics*, Chapter 78: "PTFE–Silicate Composites via Sol–Gel Processes", pp. 953–962, McKenzie, J. and Ulrich, D., Wiley Interscience, pp. 953–962, 1988.

Doyle, W.F. and Uhlmann, D.R., *Ultrastructure Processing of Advanced Ceramics*, Chapter 61: "Fluoropolymer–Modified Silicate Glasses", eds. McKenzie, J. and Ulrich, D., Wiley Interscience, pp. 795–805, 1988.

*Primary Examiner*—Ralph H. Dean

[57] ABSTRACT

This invention relates to a fluoropolymer nanocomposite comprising a fluoropolymer phase and an inorganic oxide phase dispersed throughout, said inorganic oxide phase having either no particles or particles substantially all of which have a particle size of less than about 75 nm which can be determined by small angle x-ray scattering and transmission electron microscopy techniques. These nanocomposites are useful as protective coatings.

40 Claims, 4 Drawing Sheets

100nm ___     Print Magnification = 105,000x

100nm　　　Print Magnification = 105,000x

FLUOROPOLYMER NANOCOMPOSITES

This application claims the priority benefit of U.S. Provisional application Ser. No. 60/000,571, filed Jun. 28, 1995 and U.S. Provisional application Ser. No. 60/002,054, filed Aug. 9, 1995.

FIELD OF THE INVENTION

This invention concerns a fluoropolymer composition having a nanodimensional inorganic component and a linear or branched fluoropolymer component.

BACKGROUND OF THE INVENTION

It is known to blend organic polymers with inorganic fillers either in order to improve some property of those polymers or to reduce the cost of the polymeric compositions by substituting cheaper inorganic materials for more expensive organic materials. Typical inorganic fillers can be either particulate or fibrous and can be derived from a variety of materials, including naturally occurring minerals and glass. In most cases, the inorganic filler is discontinuous and can be separated from the polymer matrix by simple mechanical processes or by extraction of the polymer component therefrom.

It is also known that polysilicate or other inorganic oxide networks and particles can be generated from molecular precursors through room temperature hydrolytic and condensation sol-gel reactions. Such reactions generally require cosolvents for the reactants water and the molecular precursor compound, such as a tetraalkoxysilane, and are catalyzed by either acid or base.

A particularly interesting and potentially useful construct would involve a three-dimensional polysilicate or other inorganic oxide network dispersed throughout a polymer matrix and thus altering polymer properties leading to improvements, such as enhancing durability and adhesion. Certain properties of polymers could be improved, and new properties imparted to polymers by providing hybrid inorganic-organic polymer compositions comprising inorganic phases within polymeric phases. For example, U.S. Pat. No. 5,252,654 describes a polymeric composite of an organic polymer and an inorganic glassy polymer and a process for making such composites which are useful as protective coatings and as nonlinear optical elements. The '654 process requires substantial water solubility of the polymer component.

Uniformity of incorporation of fluoroalkyl polymers in sol-gel derived silica glasses is unknown since substantially fluorinated polymers are not soluble in the media used for sol-gel chemistry. Gross macroscopic phase separation of the fluoropolymer portions in the glasses is a likely outcome. For example, W. F. Doyle and D. R. Uhlmann et al., in "PTFE-Silicate Composites via Sol-Gel Processes", Chapter 78, *Ultrastructure Processing of Advanced Ceramics*, J. McKenzie and D. Ulrich (eds.), Wiley Interscience, (1988) pp. 953–962 describe polytetrafluoroethylene (PTFE)-SiO$_2$ composite materials made by combining PTFE dispersions with tetraethylorthosilicate (TEOS), then converting the TEOS to polysilicate via the aqueous sol-gel process. The microstructure of the resulting material exhibited agglomeration of PTFE in an inorganic matrix with the size of the agglomerates being on a 10-μm scale.

U.S. Pat. No. 5,412,016 describes the formation of inorganic/organic "hybrid" materials using strong carboxylic acids, e.g., formic acid, which rapidly react with an inorganic network precursor to form inorganic networks without the need for either cosolvents or water as a reactant. No fluorine-bearing network precursors or fluorinated solvents are disclosed.

The only tractable solvents for highly fluorinated polymers are fluorinated solvents such as perfluoroaliphatic, polyfluoroaliphatic and perfluoroaromatic solvents which are non-solvents for reactants water, the molecular precursor compound, and acidic or basic catalysts generally used to promote inorganic network formation via conventional sol-gel chemistry. The present invention provides chemistry to enable inorganic oxide precursors to polymerize in a fluorinated solvent medium and to then generate organic/inorganic "hybrid" nanocomposites in which the organic portion is a soluble fluoropolymer and the size of any particles with an inorganic phase is on a nanometer scale, i.e., less than about 75 nm. A process of the present invention can work with these highly fluorinated solvent systems because water is not necessary as an initial reagent and a strong carboxylic acid, such as trifluoroacetic (TFA), which is readily soluble in the fluorinated solvents of interest, can promote the reaction of inorganic oxide precursors without additional catalysts.

The nanocomposite of the present invention is an improvement over unmodified fluoropolymers and prior attempts to incorporate an inorganic phase within fluoropolymers in that it has been found hereunder that certain fluoropolymers when incorporated with an inorganic oxide phase generated from fluorine-bearing inorganic oxide precursors yield a nanocomposite having higher abrasion resistance and displaying better adhesion to oxide surfaces than that of the fluoropolymer by itself. The inorganic oxide phase of the nanocomposites of the present invention either has no discernible particle(s) or substantially all particle(s) having a particle size of less than about 75 nm.

SUMMARY OF THE INVENTION

The present invention provides a fluoropolymer nanocomposite comprising (a) a fluoropolymer phase comprising at least one fluoropolymer; and (b) a partially or fully cross-linked inorganic oxide phase prepared from at least one inorganic oxide precursor, said inorganic oxide phase being dispersed within said fluoropolymer phase and said inorganic oxide phase either exhibiting no particles or substantially all particles present in the inorganic oxide phase having a particle size of less than about 75 nm; the fluoropolymer and the inorganic oxide precursor being soluble in a fluorinated solvent.

The present invention also provides a process for the preparation of a fluoropolymer nanocomposite comprising (a) a fluoropolymer phase comprising at least one fluoropolymer; and (b) a partially or fully cross-linked inorganic oxide phase prepared from at least one inorganic oxide precursor, said inorganic oxide phase being dispersed within said fluoropolymer phase and exhibiting no particles or substantially all particles having a particle size of less than about 75 nm; comprising:

(a) contacting at least one fluoropolymer soluble in a fluorinated solvent with at least one inorganic oxide precursor soluble in the fluorinated solvent and an optional gelling agent in the presence of the fluorinated solvent to form a solution;

(b) allowing the inorganic oxide precursor to partially or fully cross-link to form an inorganic oxide phase dispersed within a fluoropolymer phase; and (c) optionally, isolating the fluoropolymer nanocomposite.

The present invention further provides a coating composition, comprising a fluoropolymer nanocomposite, said fluoropolymer nanocomposite comprising, a fluoropolymer phase comprising at least one fluoropolymer, and at least one partially or fully cross-linked inorganic oxide phase prepared from at least one inorganic oxide precursor, said inorganic oxide phase being dispersed within said fluoropolymer phase, said inorganic oxide phase exhibiting either no particles or substantially all particles present in the inorganic oxide phase having a particle size of less than about 75 nm, the fluoropolymer and the inorganic oxide precursor being soluble in a fluorinated solvent.

The present invention also provides a coated substrate wherein the coating comprises a fluoropolymer nanocomposite, said fluoropolymer nanocomposite comprising, a fluoropolymer phase comprising at least one fluoropolymer, and at least one partially or fully cross-linked inorganic oxide phase prepared from at least one inorganic oxide precursor, said inorganic oxide phase being dispersed within said fluoropolymer phase, said inorganic oxide phase exhibiting either no particles or substantially all particles present in the inorganic oxide phase having a particle size of less than about 75 nm, the fluoropolymer and the inorganic oxide precursor being soluble in a fluorinated solvent.

The present invention also provides a coated substrate wherein the coating is a multilayer coating comprising: a primer, a top coat, and optionally one or more intermediate coats between the primer and the topcoat, wherein the topcoat is a fluoropolymer and the primer is a coating comprising, a fluoropolymer nanocomposite, said fluroropolymer nanocomposite comprising, a fluoropolymer phase comprising at least one fluoropolymer, and at least one partially or fully cross-linked inorganic oxide phase prepared from at least one inorganic oxide precursor, said inorganic oxide phase being dispersed within said fluoropolymer phase, said inorganic oxide phase exhibiting either no particles or substantially all particles present in the inorganic oxide phase having a particle size of less than about 75 nm, the fluoropolymer and the inorganic oxide precursor being soluble in a fluorinated solvent.

The present invention further provides an anti-reflective coating for an optoelectronic display device, comprising the fluoropolymer nanocomposite described above; an interlayer dielectric coating having improved dimensional stability and improved bonding to metal top coats after thermal cycling, comprising the fluoropolymer nanocomposite described above; an article of cookware comprising a metal substrate coated with a scratch-resistant, non-stick coating system wherein said coating system comprises a primer applied to a metal substrate and a topcoat adhered to said primer, said primer comprising the fluoropolymer nanocomposite described above; and an article of cookware comprising a metal substrate coated with a scratch-resistant, non-stick coating system wherein said coating system comprises a primer applied to a metal substrate and a topcoat adhered to said primer, said primer comprising a fluoropolymer nanocomposite as described above.

DETAILED DESCRIPTION

Figure 1:
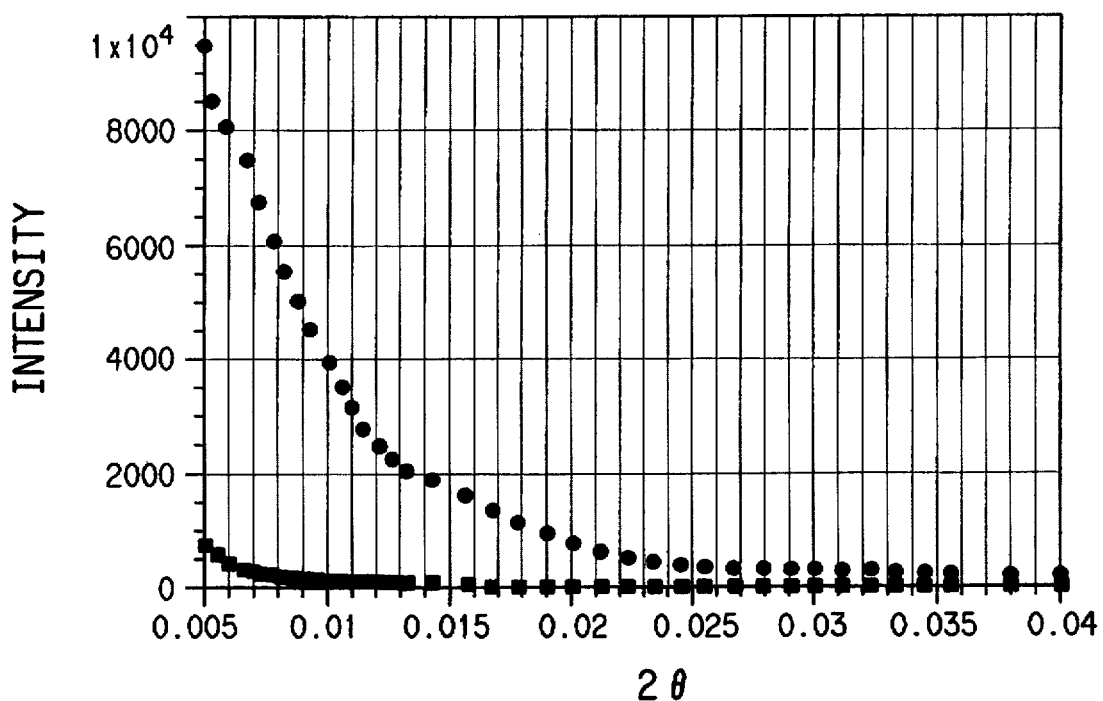
FIG. 1 is a graph comparing the x-ray scattering intensity of a fluoropolymer nanocomposite of the present invention (depicted by squares) comprising a copolymer of tetrafluoroethylene and 2,2-bis(trifluoromethyl)-4,5-difluoro-1,3-dioxole, namely "TEFLON" AF, in hexafluorobenzene and an inorganic network derived from $Si(OCH_2CF_3)_4$ (FES) with a composition (depicted by circles) comprising "TEFLON" AF and a fumed silica, namely OX-50, as described in Example 8.

The fluoropolymer nanocomposites of the present invention comprise at least one partially or fully cross-linked inorganic oxide phase dispersed in a fluoropolymer phase, the inorganic oxide phase exhibiting no discernible particles or if any particles are present (i.e., discernible) substantially all of said particles have a particle size of less than about 75 nm. The fluoropolymer nanocomposites of the present invention comprise wet gels and dried material. By "wet gel" is meant that there is a fluorinated solvent surrounding the fluoropolymer and inorganic oxide phases. Upon drying of the wet gel, solvent, volatile by-products and residual reactants can be removed to yield a dried fluoropolymer nanocomposite. Drying may also promote further network bonding, e.g., condensation reaction, within the inorganic oxide phase. Nanocomposite as used herein excludes polymer blends, block co-polymers and conventional inorganic filled polymers.

The term "inorganic oxide phase" refers to the material resulting from the condensation of the molecular inorganic oxide precursor which becomes partially or fully cross-linked and is dispersed within the fluoropolymer phase. The inorganic oxide phase can be a continuous network without discernible particles or if particles are present substantially all of said particles have particle(s) a size less than about 75 nm. Particle size is the diameter of (equivalent) spheres. X-ray scattering or transmission electron microscopy techniques can be used to determine whether the inorganic oxide phase exhibits any particles or not, and can be used to determine the particle size of any particles that are discernible. Failure to detect particles with these techniques is consistent with the inorganic oxide phase exhibiting no particles. Preferably, the inorganic oxide phase has either no discernible particles or if particles exist substantially all of the particles have a particle size of less than about 50 nm. Both types of inorganic oxide phase (no particles and particles <75 nm) are prepared from at least one inorganic oxide precursor. Within the network or the particle(s) comprising the inorganic oxide phase, atoms from the inorganic oxide precursors bond to form a partially or fully crosslinked system. By "partially crosslinked" is meant that some of the bonds of the inorganic oxide phase may not be part of the skeleton of the inorganic oxide phase, e.g., some may have nonbridging groups such as —OH or —OR, wherein R are fluoroalkoxy groups, as defined above, attached to them. Essentially none of the bonds of the inorganic oxide phase are covalently bound to the fluoropolymer of the nanocomposite unless specifically provided for and enabled by the chemistry.

By "dispersed" is meant that the inorganic oxide phase can be continuous forming a semi-interpenetrating network with the fluoropolymer wherein the inorganic oxide phase is dispersed substantially uniformly throughout the fluoropolymer phase and particles are not discernible via x-ray scattering or transmission electron microscopy techniques, or the inorganic oxide phase can be discontinuous and form a heterogeneous mixture of extremely small particles within the fluoropolymer phase, wherein substantially all of said particles have a particle size of less than about 75 nm.

By "substantially all" is meant that for fluoropolymer nanocomposites in which the inorganic phase is present primarily as particles, at least 90%, preferably at least 95%, of those particles having a particle size of less than about 75 nm.

The term "semi-interpenetrating network" is used herein to mean a polymer composition wherein a linear or branched organic polymer and a partially or fully cross-linked inorganic network have been combined to form a nanocomposite with essentially no covalent bonding between the organic polymer and the inorganic polymer.

Preferred inorganic oxide phases comprise silica, titania, alumina, and zirconia. The most preferred inorganic oxide phase comprises silica.

Compounds of aluminum, boron, germanium, silicon, tin, titanium and zirconium can be useful as inorganic oxide precursors in the present invention. However, the inorganic oxide precursor of the present invention must be soluble in a fluorinated solvent. Thus, the inorganic oxide precursor will necessarily contain fluorinated groups.

By "prepared from at least one inorganic oxide precursor" is meant that at least one inorganic oxide precursor will be used in the preparation of the inorganic phase along with other reactants as needed or desired.

The inorganic oxide precursor can comprise compounds having the formula $(R_fC_aH_{2a}O)_nMR_{4-n}$, wherein M is Ge, Si or Sn, or $(R_fC_aH_{2a}O)_nM^1R_{4-n}(HOR)_q^1$, wherein $M^1$ is Ti or Zr and $q^1$ is 0 or 1; a is 1 to 10; and n is 2, 3 or 4, and $R_f$ and R are as defined in Formula I.

The inorganic oxide precursor can also comprise a compound having the formula $(R_fC_aH_{2a}O)_{n'}M'R_{3-n'}$, wherein: M' is Al or B; n' is 1, 2, or 3; and a, $R_f$ and R are as defined in Formula I.

The inorganic oxide precursor can further comprise a chelating compound having the formula $(R_fC_aH_{2a}O)_{n''}M'^{c^n}D^dp$ wherein: M" is Si, Al, Ti or Zr; D is a chelating ligand, optionally fluorinated; cn is a silicon, aluminum, titanium or zirconium coordination number, being in each case an integer having a value of 4–6; d is a number, either 2 or 3, corresponding to the chelating ability of the ligand D, d being 2 for a bidentate ligand and 3 for a tridentate ligand; p is either 1, 2 or 3, except that for d=3, p always is 1; and n" is cn–(d×p).

Chelating compounds suitable for use in the present invention are chemicals containing chelating ligands capable of bonding to silicon, aluminum, titanium or zirconium through two or more oxygen atoms. Illustrative of compounds containing bidentate chelating ligands are those which are derived from 1,1,1,5,5,5-hexafluoro-2,4-pentanedione. Illustrative of compounds containing tridentate chelating ligands is triethanolamine. Representative examples are $Si(CF_3C(O)CHC(O)CF_3)_2(OCH_2R_f)_2Ti(OCH_2R_f)_4$, $Al(OCH_2R_f)_3$ and $Al(CF_3C(O)CHC(O)CF_3)(OCH_2)R_f$.

Linear and branched fluoroalcohols can be used in the preparation of compounds useful in the present invention; however, linear fluoroalcohols are preferred. Preferably, various fluorine-bearing silanes are used as the inorganic oxide precursors in the formation of the inorganic oxide phase. The silanes can be substituted, for example, with polyfluoroalkoxy groups or fluoroalkyl groups. The silanes can be di-, tri- and tetrafunctional molecules, dioxolanes, or "stars", compounds having multiple arms terminating in di- and trifluoroalkoxy functionality. The inorganic oxide precursor can also be a fluorinated oligomeric compound such as a polysilicate.

Preferably, the inorganic oxide precursor is selected from the group consisting of a compound of formula I, II, IIA, III, IIIA, IV, V, VA and VI as described below:

I: a compound having the formula

$(R_fC_aH_{2a}O)_tSiR_{4-t}$  (I)

wherein:

$R_f$ has up to about 18 carbon atoms and is selected from the group consisting of:
(a) $C_1$ to about $C_{18}$ perfluoroalkyl;
(b) —[$CF_2CF(CF_3)O$]$_r$—$CF_2$—$CF_2$—$CF_3$, wherein r is an integer of at least 1;
(c) —$CF_2$—($CF_2$—O)$_q$—$CF_3$, wherein q is an integer of at least 2; and
(d) —$CH_2$—$C(CF_3)_2$—$CF_2$—$CF_2$—$CF_3$;

each $R_f$ optionally substituted with one or more hydrogen;

R is selected from the group consisting of:
hydrogen, $C_1$ to about $C_8$ alkyl, $C_aH_{2a}R_f$, $C_1$ to about $C_8$ alkoxy, $C_1$ to about $C_{10}$ carboxy, $C_1$ to about $C_{10}$ fluorocarboxy, $C_2$ to about $C_8$ alkenyl, $C_2$ to about $C_8$ alkynyl, $C_6H_5$, aryl, and aralkyl;

t is 1, 2, 3 or 4; and a is an integer from 1 to about 10;

II: a compound having the formula:

$X(Si(OC_aH_{2a}R_f)_3)_n$  (II)

wherein

X is at least one organic link selected from the group consisting of:
(a) $R^1_mSiY_{4-m}$;

(b) ring structures

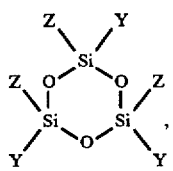   IIb(i)

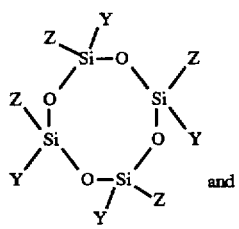   IIb(ii)

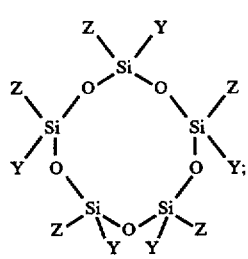   IIb(iii)

(c) $R^1_m Si(OSi(CH_3)_2Y)_{4-m}$;
(d) $CH_3SiY_2OSiY_2CH_3$;
(e) $Y_3SiOSiY_3$;
(f) $Y_2(CH_3)Si(CH_2)_b Si(CH_3)Y_2$;
(g) $Y_3Si(CH_2)_b SiY_3$;
(h) $Y_3SiC_6H_4SiY_3$;
(i) substituted benzene, including all isomers, selected from the group consisting of:
  (i) $C_6H_3(SiZ_{3-c}Y_c)_3$;
  (ii) $C_6H_2(SiZ_{3-c}Y_c)_4$;
  (iii) $C_6H(SiZ_{3-c}Y_c)_5$; and
  (iv) $C_6(SiZ_{3-c}Y_c)_6$; and
(j) substituted cyclohexane, including all stereoisomers, selected from the group consisting of:
  (i) $1,2$-$C_6H_{10}(Y)_2$; $1,3$-$C_6H_{10}(Y)_2$; $1,4$-$C_6H_{10}(Y)_2$;
  (ii) $1,2,4$-$C_6H_9(Y)_3$; $1,2,3$-$C_6H_9(Y)_3$; $1,3,5$-$C_6H_9(Y)_3$;
  (iii) $1,2,3,4$-$C_6H_8(Y)_4$; $1,2,4,5$-$C_6H_8(Y)_4$; $1,2,3,5$-$C_6H_8(Y)_4$;
  (iv) $1,2,3,4,5$-$C_6H_7(Y)_5$; and
  (v) $C_6H_6(Y)_6$;

$R_f$ has up to about 18 carbon atoms and is selected from the group consisting of:
(a) $C_1$ to about $C_{18}$ perfluoroalkyl;
(b) —[$CF_2CF(CF_3)O$]$_r$—$CF_2$—$CF_2$—$CF_3$, wherein r is an integer of at least 1;
(c) —$CF_2$—($CF_2$—$O$)$_q$—$CF_3$, wherein q is an integer of at least 2; and
(d) —$CH_2$—$C(CF_3)_2$—$CF_2$—$CF_2$—$CF_3$;

each $R_f$ optionally substituted with one or more hydrogen;
Z is $C_1$ to about $C_4$ alkyl, 3,3,3-trifluoropropyl, aralkyl or aryl;
Y is —$(CR^2R^3)_k CR^4R^5CR^6R^7(CR^8R^9)_h$—
$R^1$ is $C_1$ to about $C_8$ alkyl or aryl;
$R^2$ to $R^9$ are each independently hydrogen, $C_1$ to about $C_8$ alkyl, or aryl, provided that at least one of $R^4$ to $R^7$ is hydrogen;
m is 0, 1 or 2;
k and h are each independently an integer from 0 to 10, provided that at least one of k or h is zero;

a is an integer from 1 to about 10;
b is an integer from 1 to about 10;
c is 1, 2 or 3; and
n is an integer greater than or equal to 2;
IIA: a compound having the formula:

$$X(R^{10}Si(OC_aH_{2a}R_f)_2)_n \qquad (IIA)$$

wherein:
X is at least one organic link selected from the group consisting of:
(a) $R^1_m SiY_{4-m}$;
(b) ring structures

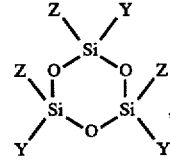   IIAb(i)

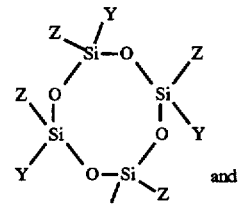   IIAb(ii)

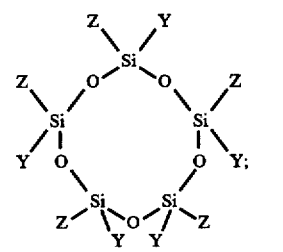   IIAb(iii)

(c) $R^1_m Si(OSi(CH_3)_2Y)_{4-m}$;
(d) $CH_3SiY_2OSiY_2CH_3$;
(e) $Y_3SiOSiY_3$;
(f) $Y_2(CH_3)Si(CH_2)_b Si(CH_3)Y_2$;
(g) $Y_3Si(CH_2)_b SiY_3$;
(h) $Y_3SiC_6H_4SiY_3$;
(i) substituted benzene, including all isomers, selected from the group consisting of:
  (i) $C_6H_3(SiZ_{3-c}Y_c)_3$;
  (ii) $C_6H_2(SiZ_{3-c}Y_c)_4$;
  (iii) $C_6H(SiZ_{3-c}Y_c)_5$; and
  (iv) $C_6(SiZ_{3-c}Y_c)_6$; and
(j) substituted cyclohexane, including all stereoisomers, selected from the group consisting of:
  (i) $1,2$-$C_6H_{10}(Y)_2$; $1,3$-$C_6H_{10}(Y)_2$; $1,4$-$C_6H_{10}(Y)_2$;
  (ii) $1,2,4$-$C_6H_9(Y)_3$; $1,2,3$-$C_6H_9(Y)_3$; $1,3,5$-$C_6H_9(Y)_3$;
  (iii) $1,2,3,4$-$C_6H_8(Y)_4$; $1,2,4,5$-$C_6H_8(Y)_4$; $1,2,3,5$-$C_6H_8(Y)_4$;
  (iv) $1,2,3,4,5$-$C_6H_7(Y)_5$; and
  (v) $C_6H_6(Y)_6$;

$R_f$ has to about 18 carbon atoms and is selected from the group consisting of:
(a) $C_1$ to about $C_{18}$ perfluoroalkyl;
(b) —[$CF_2CF(CF_3)O$]$_r$—$CF_2$—$CF_2$—$CF_3$, wherein r is an integer of at least 1;
(c) —$CF_2$—($CF_2$—$O$)$_q$—$CF_3$, wherein q is an integer of at least 2; and (d) —$CH_2$—$C(CF_3)_2$—$CF_2$—$CF_2$—$CF_3$;

each $R_f$ optionally substituted with one or more hydrogen;

Z is $C_1$ to about $C_4$ alkyl, 3,3,3-trifluoropropyl, aralkyl or aryl;

Y is —$(CR^2R^3)_k CR^4R^5 CR^6R^7 (CR^8R^9)_h$—

$R^1$ is $C_1$ to about $C_8$ alkyl or aryl;

$R^2$ to $R^9$ are each independently hydrogen, $C_1$ to about $C_8$ alkyl, or aryl, provided that at least one of $R^4$ to $R^7$ is hydrogen;

$R^{10}$ is $C_1$ to about $C_8$ alkyl or $C_a H_{2a} R_f$;

m is 0, 1 or 2;

k and h are each independently an integer from 0 to 10, provided that at least one of k or h is zero;

a is an integer from 1 to about 10;

b is an integer from 1 to about 10;

c is 1, 2 or 3; and n is an integer greater than or equal to 2;

III: a compound having the formula:

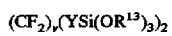  (III)

wherein:

$R^{13}$ is $C_1$ to about $C_8$ alkyl, $C_1$ to about $C_{10}$ carboxy, $C_1$ to about $C_{10}$ fluorocarboxy, halogen or $C_a H_{2a} R_f$;

$R_f$ has up to about 18 carbon atoms and is selected from the group consisting of:
 (a) $C_1$ to about $C_{18}$ perfluoroalkyl;
 (b) —$[CF_2CF(CF_3)O]_r$—$CF_2$—$CF_2$—$CF_3$, wherein r is an integer of at least 1;
 (c) —$CF_2$—$(CF_2$—$O)_q$—$CF_3$, wherein q is an integer of at least 2; and
 (d) —$CH_2$—$C(CF_3)_2$—$CF_2$—$CF_2$—$CF_3$;

each $R_f$ optionally substituted with one or more hydrogen;

a is an integer from 1 to about 10;

v is an even integer from 2 to about 14; and

Y is —$(CR^2R^3)_k CR^4R^5 CR^6R^7 (CR^8R^9)_h$—

$R^1$ is $C_1$ to about $C_8$ alkyl or aryl;

$R^2$ to $R^9$ are each independently hydrogen, $C_1$ to about $C_8$ alkyl, or aryl, provided that at least one of $R^4$ to $R^7$ is hydrogen; and k and h are each independently an integer from 0 to 10, provided that at least one of k or h is zero;

IIIA: a compound having the formula:

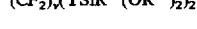  (IIIA)

wherein:

$R^{10}$ is $C_1$ to about $C_8$ alkyl or $C_a H_{2a} R_f$;

$R_f$ has up to about 18 carbon atoms and is selected from the group consisting of:
 (a) $C_1$ to about $C_{18}$ perfluoroalkyl;
 (b) —$[CF_2CF(CF_3)O]_r$—$CF_2$—$CF_2$—$CF_3$, wherein r is an integer of at least 1;
 (c) —$CF_2$—$(CF_2$—$O)_q$—$CF_3$, wherein q is an integer of at least 2; and
 (d) —$CH_2$—$C(CF_3)_2$—$CF_2$—$CF_2$—$CF_3$;

each $R_f$ optionally substituted with one or more hydrogen;

a is an integer from 1 to about 10;

v is an even integer from 2 to about 14; and

Y is —$(CR^2R^3)_k CR^4R^5 CR^6R^7 (CR^8R^9)_h$—

$R^{13}$ is $C_1$ to about $C_8$ alkyl, $C_1$ to about $C_{10}$ carboxy, $C_1$ to about $C_{10}$ fluorocarboxy, halogen or $C_a H_{2a} R_f$;

$R^1$ is $C_1$ to about $C_8$ alkyl or aryl;

$R^2$ to $R^9$ are each independently hydrogen, $C_1$ to about $C_8$ alkyl, or aryl, provided that at least one of $R^4$ to $R^7$ is hydrogen; and k and h are each independently an integer from 0 to 10, provided that at least one of k or h is zero;

IV: a fluoroalkylphenylsilane having the formula:

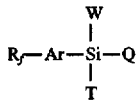  (IV)

wherein:

$R_f$ has up to about 18 carbon atoms and is selected from the group consisting of:
 (a) $C_1$ to about $C_{18}$ perfluoroalkyl;
 (b) —$[CF_2CF(CF_3)O]_r$—$CF_2$—$CF_2$—$CF_3$, wherein r is an integer of at least 1;
 (c) —$CF_2$—$(CF_2$—$O)_q$—$CF_3$, wherein q is an integer of at least 2; and
 (d) —$CH_2$—$C(CF_3)_2$—$CF_2$—$CF_2$—$CF_3$;

each $R_f$ optionally substituted with one or more hydrogen;

Ar is a divalent aromatic radical;

W is selected from the group consisting of
 (e) $C_1$ to about $C_8$ alkyl;
 (f) $R_f$—Ar, wherein each of $R_f$ and Ar is as defined above;
 (g) halogen selected from the group consisting of chlorine, bromine and iodine;
 (h) $C_1$ to about $C_8$ alkoxy;
 (i) $C_1$ to about $C_8$ fluoroalkoxy; and
 (j) $C_1$ to about $C_{10}$ carboxy or fluorocarboxy; and each of Q and T independently is selected from the group consisting of
 (k) halogen selected from the group consisting of chlorine, bromine and iodine;
 (l) $C_1$ to about $C_8$ alkoxy;
 (m) $C_1$ to about $C_8$ fluoroalkoxy; and
 (n) $C_1$ to about $C_{10}$ carboxy or fluorocarboxy;

V: a dioxolane having the formula:

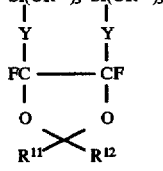  (V)

wherein:

$R^{13}$ is $C_1$ to about $C_8$ alkyl, $C_1$ to about $C_{10}$ carboxy, $C_1$ to about $C_{10}$ fluorocarboxy, halogen or $C_a H_{2a} R_f$;

$R_f$ has up to about 18 carbon atoms and is selected from the group consisting of:
 (a) $C_1$ to about $C_{18}$ perfluoroalkyl;
 (b) —$[CF_2CF(CF_3)O]_r$—$CF_2$—$CF_2$—$CF_3$, wherein r is an integer of at least 1;
 (c) —$CF_2$—$(CF_2$—$O)_q$—$CF_3$, wherein q is an integer of at least 2; and
 (d) —$CH_2$—$C(CF_3)_2$—$CF_2$—$CF_2$—$CF_3$;

each $R_f$ optionally substituted with one or more H;

$R^{11}$ and $R^{12}$ are each independently selected from $C_1$ to $C_3$ fluoroalkyl or fluorine;

a is an integer from 1 to about 10; and

Y is —$(CR^2R^3)_k CR^4R^5 CR^6R^7 (CR^8R^9)_h$—

11

R² to R⁹ are each independently hydrogen, $C_1$ to about $C_8$ alkyl, or aryl, provided that at least one of R⁴ to R⁷ is hydrogen; and k and h are each independently an integer from 0 to 10, provided that at least one of k or h is zero;

VA: a dioxolane having the formula:

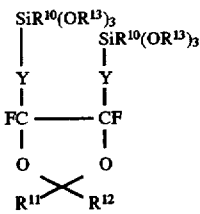 (VA)

wherein:

$R^{10}$ is $C_1$ to about $C_8$ alkyl or $C_aH_{2a}R_f$;

$R_f$ has up to about 18 carbon atoms and is selected from the group consisting of:
(a) $C_1$ to about $C_{18}$ perfluoroalkyl;
(b) —[CF₂CF(CF₃)O]$_r$CF2CF2CF3, wherein r is an integer of at least 1;
(c) —CF₂—(CF₂—O)$_q$—CF₃, wherein q is an integer of at least 2; and
(d) —CH₂—C(CF₃)₂—CF₂—CF₂—CF₃;

each $R_f$ optionally substituted with one or more H;

R¹¹ and R¹² are each independently selected from $C_1$ to $C_3$ fluoroalkyl or fluorine;

a is an integer from 1 to about 10; and

Y is —(CR²R³)$_k$CR⁴R⁵CR⁶R⁷(CR⁸R⁹)$_h$—

$R^{13}$ is $C_1$ to about $C_8$ alkyl, $C_1$ to about $C_{10}$ carboxy, $C_1$ to about $C_{10}$ fluorocarboxy, halogen or $C_aH_{2a}R_f$;

R² to R⁹ are each independently hydrogen, $C_1$ to about $C_8$ alkyl, or aryl, provided that at least one of R⁴ to R⁷ is hydrogen; and k and h are each independently an integer from 0 to 10, provided that at least one of k or h is zero; and VI: a compound having the formula:

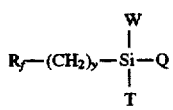 (VI)

wherein:

y is an integer from 2 to about 10;

$R_f$ has up to about 18 carbon atoms and is selected from the group consisting of
(a) $C_1$ to about $C_{18}$ perfluoroalkyl;
(b) —[CF₂CF(CF₃)O]$_r$—CF₂—CF₂—CF₃, wherein r is an integer of at least 1;
(c) —CF₂—(CF₂—O)$_q$—CF₃, wherein q is an integer of at least 2; and
(d) —CH₂—C(CF₃)₂—CF₂—CF₂—CF₃;

each $R_f$ optionally substituted with one or more H;

Ar is a divalent aromatic radical;

W is selected from the group consisting of
(e) $C_1$ to about $C_8$ alkyl;
(f) $R_f$—Ar, wherein each of $R_f$ and Ar is as defined above;
(g) halogen selected from the group consisting of chlorine, bromine and iodine;
(h) $C_1$ to about $C_8$ alkoxy;
(i) $C_1$ to about $C_8$ fluoroalkoxy; and

12

(j) $C_1$ to about $C_{10}$ carboxy or fluorocarboxy; and each of Q and T independently is selected from the group consisting of
(k) halogen selected from the group consisting of chlorine, bromine and iodine;
(l) $C_1$ to about $C_8$ alkoxy;
(m) $C_1$ to about $C_8$ fluoroalkoxy; and
(n) $C_1$ to about $C_{10}$ carboxy or fluorocarboxy.

Preferred fluorinated oligomeric compounds are polysilicates selected from the group consisting of a compound of formula VII, VIII and IX as described below:

VII: an oligomeric compound having the formula:

 (VII)

wherein:

z is a number from about 0.5 to about 3.0;

a is an integer from 1 to about 10; and $R_f$ has up to about 18 carbon atoms and is selected from the group consisting of:
(a) $C_1$ to about $C_{18}$ perfluoroalkyl;
(b) —[CF₂CF(CF₃)O]$_r$—CF₂—CF₂—CF₃, wherein r is an integer of at least 1;
(c) —CF₂—(CF₂—O)$_q$—CF₃, wherein q is an integer of at least 2; and
(d) —CH₂—C(CF₃)₂—CF₂—CF₂—CF₃;

each $R_f$ optionally substituted with one or more hydrogen;

VIII: an oligomeric compound having the formula:

 (VIII)

wherein:

z is a number from about 0.5 to about 3.0;

y is an integer from 2 to about 10;

each $R^{14}$ is independently $C_1$ to about $C_8$ alkyl, $C_1$ to about $C_{10}$ carboxy, $C_1$ to about $C_{10}$ fluorocarboxy or $C_aH_{2a}R_f$;

a is an integer from 1 to about 10; and $R_f$ has up to about 18 carbon atoms and is selected from the group consisting of:
(a) $C_1$ to about $C_{18}$ perfluoroalkyl;
(b) —[CF₂CF(CF₃)O]$_r$—CF₂—CF₂—CF₃, wherein r is an integer of at least 1;
(c) —CF₂—(CF₂—O)$_q$—CF₃, wherein q is an integer of at least 2; and
(d) —CH₂—C(CF₃)₂—CF₂—CF₂—CF₃;

each $R_f$ optionally substituted with one or more hydrogen;

IX: an oligomeric compound having the formula:

 (IX)

wherein:

z is a number from about 0.5 to about 3.0;

each $R^{14}$ is independently $C_1$ to about $C_8$ alkyl, $C_1$ to about $C_{10}$ carboxy, $C_1$ to about $C_{10}$ fluorocarboxy or $C_aH_{2a}R_f$;

a is an integer from 1 to about 10;

Ar is a divalent aromatic radical; and $R_f$ has up to about 18 carbon atoms and is selected from the group consisting of:
(a) $C_1$ to about $C_{18}$ perfluoroalkyl;
(b) —[CF₂CF(CF₃)O]$_r$—CF₂—CF₂—CF₃, wherein r is an integer of at least 1;
(c) —CF₂—(CF₂—O)$_q$—CF₃, wherein q is an integer of at least 2; and (d) —CH$_2$—C(CF$_3$)$_2$—CF$_2$—CF$_2$—CF$_3$;

each R$_f$ optionally substituted with one or more hydrogen.

The R$_f$ group can be a fluoroalkyl or perfluoroalkyl group, which can be either normal or branched, and has up to about 18 carbon atoms, preferably one to eight carbon atoms, especially preferred one to three carbon atoms. Normal perfluoroalkyl groups include, for example, trifluoromethyl, perfluoroethyl, perfluoropropyl, perfluorobutyl, perfluoropentyl, perfluorohexyl, perfluorodecyl, perfluorododecyl, and perfluorooctadecyl. Fluorosilanes of formulas I–VI where R$_f$ has more than eighteen carbon atoms are considered less practical to synthesize, although such fluorosilanes would be perfectly suitable in all applications contemplated for this class of compounds. A typical suitable branched fluoroalkyl group is —CH$_2$—C(CF$_3$)$_2$—CF$_2$—CF$_2$—CF$_3$.

The R$_f$ groups also can be certain perfluoro(alkyleneoxy)alkyl) radicals. These include perfluoro(methylene (polymethyleneoxy)methyl) radicals (c) and perfluoro( (polyisopropyleneoxy)propyl) radicals (b).

Each R$_f$ can be optionally substituted with one or more hydrogen provided that the inorganic oxide precursor remains soluble in a fluorinated solvent. Thus, it may not be possible for every fluorine of the R$_f$ group to be replaced with hydrogen.

For the fluoroalkoxysilanes of formula I, R$_f$ is preferably a C$_1$ to about C$_8$ perfluoroalkyl group; most preferably, CF$_3$ or C$_3$F$_7$. R is preferably a lower alkyl of 1 to about 6 carbon atoms or a lower alkoxy group of 1 to about 6 carbon atoms; most preferably methyl, ethyl, methoxy or ethoxy. Preferably n is 3 or 4, and a is preferably 1 or 2. Preferably the alkenyl group is vinyl or allyl. The preferred aralkyl is benzyl and the preferred aryl is phenyl. Representative examples of inorganic oxide precursor compounds of formula I comprise compounds such as (CF$_3$CH$_2$O)$_4$Si known as tetrakis(trifluoroethoxy)silane (FES); (n-C$_3$F$_7$CH$_2$O)$_4$Si known as tetrakis(n-heptafluorobutoxy)silane (FBS); and Si(OCH$_2$CH$_2$R$_f$)$_4$, HSi(OCH$_2$R$_f$)$_3$, (CH$_3$O)$_3$Si (OCH$_2$CH$_2$R$_f$), (CH$_3$O)$_2$Si(OCH$_2$CH$_2$R$_f$)$_2$ and CH$_2$=CHSi (OCH$_2$R$_f$)$_3$ wherein R$_f$ is CF$_3$, C$_2$F$_5$ or n-C$_3$F$_7$.

For the compounds of formula II and IIA, X is preferably (a) R$^1_m$SiY$_{4-m}$ or (c) R$^1_m$Si(OSi(CH$_3$)$_2$Y)$_{4-m}$. The most preferred organic link X, is where m is 0, k is 0 or 1, h is 0 or 1, and all of R$^2$ to R$^9$ are hydrogen. R$_f$ is preferably CF$_3$, C$_2$F$_5$ or n-C$_3$F$_7$. Z is preferably CH$_3$; the preferred aralkyl being benzyl and the preferred aryl being phenyl. n is preferably 2–6; most preferably 2, 3, or 4. a is preferably 1 or 2, most preferably 1. Representative examples of the compounds of formula II and IIA comprise those compounds wherein X=Si(OSi(CH$_3$)$_2$CH$_2$CH$_2$)$_4$ and R$_f$=n-C$_3$F$_7$, C$_2$F$_5$ or CF$_3$; X=Si(CH$_2$CH$_2$)$_4$ and R$_f$=CF$_3$, C$_2$F$_5$ or n-C$_3$F$_7$; and X=the ring structures of formula II(b) wherein Y=CH$_2$CH$_2$, Z=CH$_3$, and R$_f$=n-C$_3$F$_7$, C$_2$F$_5$ or CF$_3$.

For the compounds of formula III and IIIA, OR$^{13}$ is preferably a fluoroalkoxy group; most preferably —OCH$_2$CF$_3$, —OCH$_2$C$_2$F$_5$ or —OCH$_2$C$_3$F$_7$. R$^2$ to R$^9$ are preferably hydrogen, and v is preferably 4, 6, 8 or 10. Representative examples of compounds of formula III comprise (C$_3$F$_7$CH$_2$O)$_3$Si(CH$_2$)$_2$(CF$_2$)$_6$(CH$_2$)$_2$Si(OCH$_2$C$_3$F$_7$)$_3$, (CF$_2$)$_6$((CH$_2$)$_2$Si(OCH$_2$CF$_3$)$_3$)$_2$, and (CF$_2$)$_6$((CH$_2$)$_2$Si (OCH$_2$CH$_3$)$_3$)$_2$.

For the compounds of formula IIA, IIIA and VA, R$^{10}$ is preferably C$_1$ to C$_3$ alkyl; most preferably methyl.

For the fluoroalkylphenylsilane compounds of formula IV, the compounds of formula VI, and the oligomeric compounds of VIII and IX R$_f$ is preferably C$_6$F$_{13}$, n-C$_8$F$_{17}$ and n-C$_{10}$F$_{21}$.

Ar in formula IV, VI and IX above, can be any divalent aromatic radical, as this term is understood in the art, including those comprising six-, ten-, and fourteen-carbon aromatic rings, including, for example, radicals remaining when two ring hydrogen atoms are removed from an aromatic compounds such as benzene, napthalene, toluene, xylene, and anthracene, or from a five-membered or six-membered heterocyclic ring containing oxygen or nitrogen atoms such as, for example, furan, pyrrole, and pyridine. Biphenyl and triphenyl groups are also included within the definition of Ar. Ar is preferably phenyl.

Preferred alkoxy groups of W, Q and T are methoxy and ethoxy groups. Preferred fluoroalkoxy groups of W, Q and T are —CH$_2$CF$_3$, —CH$_2$C$_2$F$_5$ and —CH$_2$C$_3$F$_7$. W, Q and T may also comprise other groups attached through hydrolyzable bonds such as carboxylates and oximes. Suitable compounds of formula IV comprise C$_8$F$_{17}$C$_6$H$_4$Si(OCH$_3$)$_3$; C$_{10}$F$_{21}$C$_6$H$_4$Si(OCH$_3$)$_3$; C$_8$F$_{17}$C$_6$H$_4$Si(OCH$_2$CH$_3$)$_3$; C$_{10}$F$_{21}$C$_6$H$_4$Si(OCH$_2$CF$_3$)$_3$. Suitable compounds of formula VI comprise F(CF$_2$)$_6$CH$_2$CH$_2$Si(OCH$_2$CH$_3$)$_3$; F(CF$_2$)$_6$CH$_2$CH$_2$Si(OCH$_2$CF$_3$)$_3$; F(CF$_2$)$_6$CH$_2$CH$_2$Si(OCH$_3$)$_3$; C$_8$F$_{17}$CH$_2$CH$_2$Si(OCH$_3$)$_3$, C$_8$F$_{17}$CH$_2$CH$_2$Si(OCH$_2$CH$_3$)$_3$; C$_8$F$_{17}$CH$_2$CH$_2$Si(OCH$_2$CF$_3$)$_3$; and C$_8$F$_{17}$CH$_2$CH$_2$Si (O$_2$CH$_2$C$_3$F$_7$)$_3$.

For the dioxolanes of formula V, R$_f$ is preferably CF$_3$, C$_2$F$_5$ or C$_3$F$_7$. Preferably, R$^{11}$=R$^{12}$=CF$_3$. Suitable compounds of formula V comprise

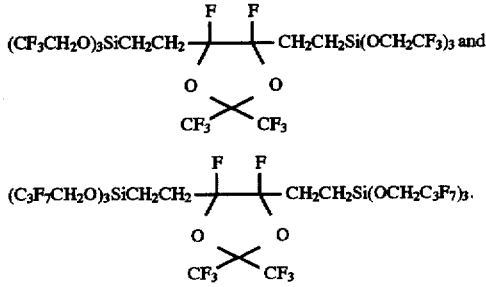

Synthesis of compounds of formula I can be afforded by alkoxylation of chlorosilanes or by alcohol exchange reactions. Compounds of formula I are thus prepared by contacting a molar excess of fluoroalcohol having the formula R$_f$C$_a$H$_{2a}$OH, wherein R$_f$ and a are defined as above, with SiCl$_4$, Si(OR$^1$)$_4$, R$^1$SiCl$_3$, R$^1$Si(OR$^1$)$_3$ or R$^1_2$SiCl$_2$, wherein R$^1$ is C$_1$ to about C$_8$ alkyl, to form the corresponding fluoroalkoxysilanes. The fluoroalcohol is typically added dropwise to the silane compound or alcohol compound, with an optional acid or base catalyst for Si(OR$^1$)$_4$ or R$^1$Si(OR$^1$)$_3$ which is being stirred, over a period of time ranging from 30 min to about 4 hours. The reaction temperature is in the range of about −15° C. to about 10° C., preferably, about 0° C. and is eventually raised to room temperature (25° C.). The fluoroalcohol reacts to replace all of the chlorine atoms of the silicon chloride, or 1, 2, 3 or all of the alkoxy groups of the silicon alkoxide compound with fluorinated alkoxy groups, with liberation of hydrogen chloride or alcohol. The fluoroalkoxysilanes product may be recovered in purified state by removal of solvent and residual alcohol followed by distillation of the crude reaction product. Hydrogen chloride by-product is normally removed by purging the reaction mixture with dry inert gas, such as argon. Specific preparations of known formula I silanes comprise (R$_f$CH$_2$O)$_4$Si(R$_f$= CF$_3$ to C$_{10}$F$_{21}$) in U.S. Pat. No. 2,993,925; (CF$_3$(CF$_2$)$_x$CX$_2$CH$_2$CH$_2$O)$_4$Si (x=0–4; X=H or F) in U.S. Pat. No. 3,491,134; and HSi(OCH$_2$CF$_3$)$_3$, ViSi(OCH$_2$CF$_3$)$_3$ (Vi= vinyl) and $CH_2=CHCH_2Si(OCH_2CF_3)_3$ in U.S. Pat. No. 4,652,663 collectively incorporated by reference herein. In addition, the preparation of $ViSi(OCH_2CF_3)_3$ is described in European Patent Application 0 232 024; and $(C_8F_{17}CH_2CH_2)_nSi(OCH_2CH_3)_{4-n}$ (n=1-3) in Japanese Kokai Application No. Sho 63-170806.

Mixtures comprising compounds of Formula I, II, IIA, III, IIIA, IV, V, VA or VI and a compound such as an inorganic oxide precursor not normally soluble in or capable of gelation by itself in the fluorinated solvent, e.g., $(R_tC_aH_{2a}O)_rSiR_{4-r}$, where R is alkoxy and t' is 0, 1 or 2, can be used in the present process as long as the mixtures are soluble in the fluorinated solvent. Thus, the at least one inorganic oxide precursor can comprise a mixture of inorganic oxide precursors, each precursor being soluble or insoluble in the fluorinated solvent provided the mixture is soluble in the fluorinated solvent. Such a mixture can be prepared, for example, from tetraethoxysilane and heptafluorobutanol to yield a mixture of formula I silanes, i.e., $(C_3F_7CH_2O)_rSi(OCH_2CH_3)_{4-r}$ or from tetraethoxysilane and $C_8F_{17}C_6H_4Si(OCH_3)_3$ to yield a mixture of silanes from formula I and formula IV. This is generally not feasible in an aliphatic fluorinated solvent; however, hexafluorobenzene can be an effective solvent.

Synthesis of the compounds of formula II and IIA are afforded from hydrosilylation reactions, i.e., an addition reaction between a compound containing a Si—H group with a compound containing aliphatic unsaturation, such as an alkene, in the presence of a catalyst or free radical initiator. Precursor segments containing —CH=CH$_2$ groups react with other precursor segments which contain terminal Si—H bonds.

Either precursor segment can contain the vinyl or other unsaturated group capable of Si—H addition. For example, $Si(CH=CH_2)_4$ reacts with $HSi(OCH_2CF_3)_3$ to form the precursor $Si[CH_2CH_2Si(OCH_2CF_3)_3]_4$; $Si(CH=CH_2)_4$ reacts with $HSiCH_3(OCH_2CF_3)_2$ to form the precursor $Si(CH_2CH_2SiCH_3(OCH_2CF_3)_2)_4$; $Si(CH=CH_2)_4$ reacts with $HSiCH_3(OCH_2CF_3)_2$ to form the precursor $Si(CH_2CH_2SiCH_3(OCH_2CF_3)_2)_4$; and cyclo $[(CH_3)HSiO]_4$ reacts with $CH_2=CH—Si(OCH_2C_3F_7)_3$ to form the precursor cyclo$[OSi(CH_3)CH_2CH_2Si(OCH_2C_3F_7)_3]_4$.

All of the following equations provide for preparation of compounds of formula II by addition of a silane across a carbon-carbon double bond for various definitions of X:

(Note that preparation of compounds of formula IIA proceed in like fashion except that the group $Si(R^{10})(OC_aH_{2a}R_f)_2$ replaces all instances of $Si(OC_aH_{2a}R_f)_3$.)

(a) when X is $R^1{}_mSiY_{4-m}$:

Eqn. 1A:

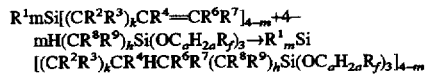

Eqn. 1B:

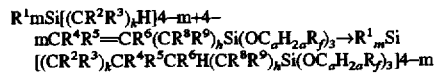

(b) when X is a ring structure of the type Ib(i), Ib(ii) or Ib(iii), as previously defined, which can be abbreviated as $(SiO)_uZ_u(YSi(OC_aH_{2a}R_f)_3)_u$, wherein u=3 for IIb(i), u=4 for IIb(ii), and u=5 for IIb(iii); then Eqn. 2A:

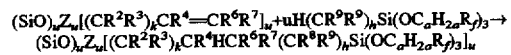

Eqn. 2B:

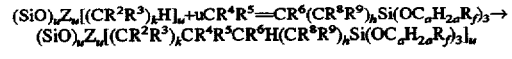

(c) when X is $R^1{}_mSi(OSi(CH_3)_2Y)_{4-m}$

Eqn. 3A:

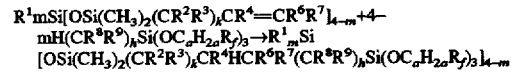

Eqn. 3B:

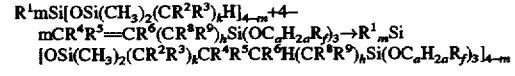

(d) when X is $CH_3SiY_2OSiY_2CH_3$:

Eqn. 4A:

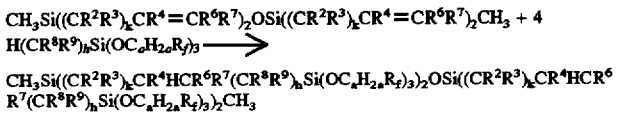

Eqn. 4B:

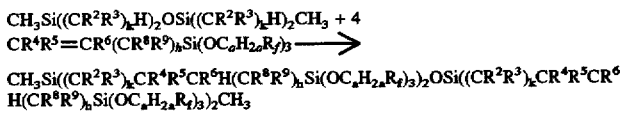

(e) when X is $Y_3SiOSiY_3$

Eqn. 5A:

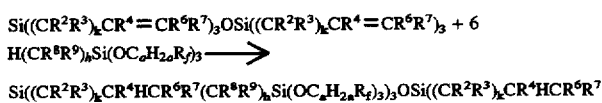

-continued $(CR^8R^9)_hSi(OC_aH_{2a}R_f)_3)_3$

Eqn. 5B:

$Si((CR^2R^3)_kH)_3OSi((CR^2R^3)_kH)_3 + 6 CR^4R^5=CR^6(CR^8R^9)_hSi(OC_aH_{2a}R_f)_3 \longrightarrow$ $Si((CR^2R^3)_kCR^4R^5CR^6H(CR^8R^9)_hSi(OC_aH_{2a}R_f)_3)_3OSi((CR^2R^3)_kCR^4R^5CR^6H(CR^8R^9)_hSi(OC_aH_{2a}R_f)_3)_3$ (f) when X is $Y_2(CH_3)Si(CH_2)_bSi(CH_3)Y_2$ Eqn. 6A:

$Si((CR^2R^3)_kCR^4=CR^6R^7)_2(CH_3)(CH_2)_bSi((CR^2R^3)_kCR^4=CR^6R^7)_2(CH_3) + 4 H(CR^8R^9)_hSi(OC_aH_{2a}R_f)_3 \longrightarrow$ $Si((CR^2R^3)_kCR^4HCR^6R^7(CR^8R^9)_hSi(OC_aH_{2a}R_f)_3)_2(CH_3)(CH_2)_bSi((CR^2R^3)_kCR^4HCR^6R^7(CR^8R^9)_hSi(OC_aH_{2a}R_f)_3)_2(CH_3)$ Eqn. 6B:

$Si((CR^2R^3)_kH)_2(CH_3)(CH_2)_bSi((CR^2R^3)_kH)_2(CH_3) + 4 CR^4R^5=CR^6(CR^8R^9)_hSi(OC_aH_{2a}R_f)_3 \longrightarrow$ $Si(CR^2R^3)_kCR^4R^5CR^6H(CR^8R^9)_hSi(OC_aH_{2a}R_f)_3)_2(CH_3)(CH_2)_bSi((CR^2R^3)_kCR^4R^5CR^6H(CR^8R^9)_hSi(OC_aH_{2a}R_f)_3)_3(CH_3)$ (g) when X is $Y_3Si(CH_2)_bSiY_3$:

Eqn. 7A:

$Si((CR^2R^3)_kCR^4=CR^6R^7)_3(CH_2)_bSi((CR^2R^3)_kCR^4=CR^6R^7)_3 + 6 H(CR^8R^9)_hSi(OC_aH_{2a}R_f)_3 \longrightarrow$ $Si((CR^2R^3)_kCR^4HCR^6R^7(CR^8R^9)_hSi(OC_aH_{2a}R_f)_3)_3(CH_2)_bSi((CR^2R^3)_kCR^4H CR^6R^7(CR^8R^9)_hSi(OC_aH_{2a}R_f)_3)_3$ Eqn. 7B:

$Si((CR^2R^3)_kH)_3(CH_2)_bSi((CR^2R^3)_kH)_3 + 6 CR^4R^5=CR^6(CR^8R^9)_hSi(OC_aH_{2a}R_f)_3 \longrightarrow$ $Si((CR^2R^3)_kCR^4R^5CR^6H(CR^8R^9)_hSi(OC_aH_{2a}R_f)_3)_3(CH_2)_bSi((CR^2R^3)_kCR^4R^5 CR^6H(CR^8R^9)_hSi(OC_aH_{2a}R_f)_3)_3$ (h) when X is $Y_3SiC_6H_4SiY_3$:

Eqn. 8A:

$Si((CR^2R^3)_kCR^4=CR^6R^7)_3C_6H_4Si((CR^2R^3)_kCR^4=CR^6R^7)_3 + 6 H(CR^8R^9)_hSi(OC_aH_{2a}R_f)_3 \longrightarrow$ $Si((CR^2R^3)_kCR^4HCR^6R^7(CR^8R^9)_hSi(OC_aH_{2a}R_f)_3)_3(CH_2)_bSi((CR^2R^3)_kCR^4H CR^6R^7(CR^8R^9)_hSi(OC_aH_{2a}R_f)_3)_3$ Eqn. 8B:

$Si((CR^2R^3)_kH)_3C_6H_4Si((CR^2R^3)_kH)_3 + 6 CR^4R^5=CR^6(CR^8R^9)_hSi(OC_aH_{2a}R_f)_3 \longrightarrow$ $Si((CR^2R^3)_kCR^4R^5CR^6H(CR^8R^9)_hSi(OC_aH_{2a}R_f)_3)_3C_6H_4Si((CR^2R^3)_kCR^4R^5 CR^6H(CR^8R^9)_hSi(OC_aH_{2a}R_f)_3)_3$ (i) when X is a substituted benzene structure of the type, as previously defined, which can be abbreviated $C_6H_{6-w}(SiZ_{3-c}Y_c)_w$, wherein w represents the number of substitutions on the benzene ring:

Eqn. 9A:

$wx(OC_aH_{2a}R_f)_3Si(CR^8R^9)_hH+C_6H_{6-w}[SiZ_{3-c}((CR^2R^3)_kCR^2R^3)_kCR^4=CR^6R^7)_c]_w \rightarrow C_6H_{6-w}[SiZ_{3-c}((CR^2R^3)_kCR^4R^5HCR^6R^7(CR^8R^9)_hSi(OC_aH_{2a}R_f)_3)_c]_w$ Eqn. 9B:

$wxCR^4R^5=CR^6(CR^8R^9)_hSi(OC_aH_{2a}R_f)_3+C_6H_{6-w}[SiZ_{3-c}((CR^2R^3)_kH)_c]_w \rightarrow C_6H_{6-w}[SiZ_{3-c}((CR^2R^3)_kCR^4R^5CR^6H(CR^8R^9)_hSi(OC_aH_{2a}R_f)_3)_c]_w$ (j) when X is a substituted cyclohexane of the type, as previously defined, which can be abbreviated $C_6H_{12-w}Y_w$, wherein w is the number of substituents; then:

Eqn. 10A:

$C_6H_{12-w}((CR^2R^3)_kCR^4=CR^6R^7)_w+w[(OC_aH_{2a}R_f)_3Si(CR^8R^9)_hH] \rightarrow C_6H_{12-w}((CR^2R^3)_kCR^4HCR^6R^7(CR^8R^9)_hSi(OC_aH_{2a}R_f)_3)_w$ For convenience the reaction of Equations denoted A or B above is chosen depending upon the commercial availability of the starting reagents. In each set of equations where an A and B are presented, h=0 in Eqn. A and k=0 in Eqn. B. Specific sources of reactants are listed hereinafter just prior to the Examples. A transition metal catalyst such as platinum, or a free radical initiator is employed in an effective amount. Examples of suitable free radical initators include "VAZO" azo compounds available from E. I. du Pont de Nemours and Company, Wilmington, Del.

These reactions can be conducted at a temperature of from about 25° C. to about 100° C. Preferably the process is conducted at about 80° C. to about 100° C. The pressure employed is typically ambient, about 1 atm ($1.01 \times 10^5$ Pa). The reactions are carried out under an inert gas atmosphere, although use of an air atmosphere is not precluded. Reaction time is typically from about 4 hours to about 24 hours.

Use of solvent is not required in these reactions. Suitable solvents which may be employed are those capable of dissolving the reactants, such as toluene, and which do not interfere with the reaction or generate desirable by-products. The desired product can be isolated by any means known to those skilled in the art. Preferably the desired product is isolated by removal of volatiles under reduced pressure.

NMR and mass spectrometry have been used to characterize product purities. Typically, yields of completed reacted material exceed 95%, with the prinicpal impurities being either reverse (Markovnikov) hydrosilyation or incompletely substituted material containing unreacted —CH=CH$_2$ groups.

Synthesis of the compounds of formula III and IIIA is afforded by the following: (Note that preparation of compounds of formula IIIA proceed in like fashion except that the group $SiR^{10}(OR^{13})_2$ replaces all instances of $Si(OR^{13}{}_3)$.)
Eqn. 11A:

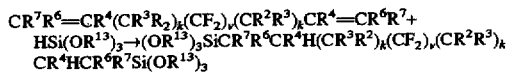

Synthesis of the compounds of formula III and IIIA can also be realized by insertion of unsaturated trifluoroalkoxysilanes or trihalosilanes into the C—I bond of $I(CF_2)_xI$, followed by reduction of the C—I to C—H using standard organic reduction reagents as shown in Equation 11B. Examples of suitable reagents are zinc metal, tri-n-butyl tin hydride or samarium iodide.
Eqn. 11B:

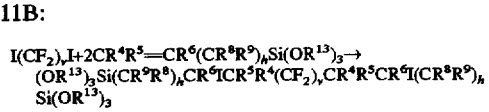

which can be converted to the following with, for example, samarium iodide ($SmI_2$).

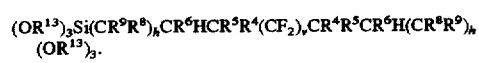

Synthesis of compounds of formula IV are described in U.S. Pat. No. 5,180,845 incorporated by reference herein and are afforded by organometallic reactions wherein the fluoroalkyl group and the silicon atom are attached to the dihalo aromatic in two sequential steps.

Synthesis of compounds of formula V and VA is readily afforded from direct hydrosilylation of $HSi(OR^{13})_3$, $HSiR^{10}(OR^{13})_2$, $HSiR^{10}Cl_2$ or $HSiCl_3$, and a 4,5-divinyl-4,5-difluoro-1,3-dioxolane), compound in the presence of a metal transition catalyst, such as Pt followed by alcoholoysis if a chlorosilane is the product.

Eq. 12:

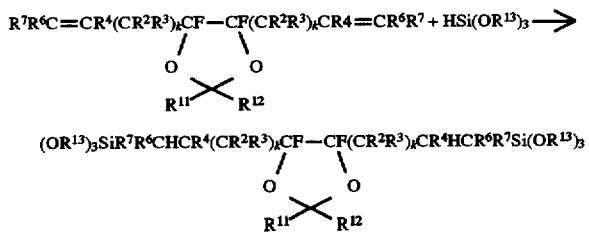

Synthesis of compounds of formula VI are prepared by methods known in the art for hydrocarbon silanes (see, Kirk-Othmer, Encyclopedia of Chemical Technology, third edition, vol. 20, and Mehrota, R. C., Pure Appl. Chem., 13, 111; 1966). The preferred method is by reacting the corresponding perfluoroalkyl trichlorosilane with the proper alcohol, such as methanol, ethanol, or 1,1,1-trifluoroethanol, for example, according to the following equation:

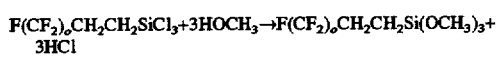

where o is 6–18.

The fluorinated trichlorosilane starting materials for the above reaction can be prepared by one of several recognized procedures; for example, see McBee, E. T., J. Am. Chem. Soc., 79, 2329 (1957); Adv. Organomet. Chem., 17, 407 (1970); U.S. Pat. No. 3,012,006; U.S. Pat. No. 4,089,882, or U.S. Pat. No. 4,549,003. In addition, $F(CF_2)_6CH_2CH_2Si(OCH_2CH_3)_3$ is commercially available from PCR incorporated, P.O. Box 1466, Gainesville, Fla. 32602 (catalog #12303-4).

The compounds of formula VII are prepared by dissolving a fluorine-bearing silane, such as one having the formula $Si(OCH_2R_f)_4$, wherein $R_f$ is as defined in formula VII, or mixed silanes, such as $Si(OCH_2R_f)_x(OR)_{4-x}$, wherein R is $C_1$ to about $C_8$ alkyl, and x=1–3, in a solvent in which water is soluble, such as isopropyl alcohol (IPA). A soluble source of fluoride ion, such as CsF, is added to the solution along with less than a 1.5:1 molar excess of water. The solution is maintained, with optional heating, until the water has substantially consumed. The by-product alcohols and any unreacted water are then removed from the system by, for instance, distillation. The remaining material is an oligomeric silicate with sufficient residual fluorine-bearing groups to be soluble in fluorinated solvents.

Alternatively, polysilicates of formula VII can be made by combining a fluorine-bearing silane such as $Si(OCH_2C_3F_7)_4$ (FBS) with a stoichiometric deficiency (i.e., <2:1) for trifluoroacetic acid (TFA) or other strong fluorocarboxylic acid. The solution will generally be heated so as to promote extensive reaction between the silane and acid. Reaction by-products (ester, alcohol and any unreacted acid) are then removed, for example, by distillation.

Preparation of the oligomeric compounds of formulas VIII and IX can proceed in like fashion using compounds of formula IV and VI. In the altnerative process using a strong fluorocarboxylic acid, heating is optional.

Formulas VII, VIII and IX are idealized formulas which correspond to 100% crosslinking of the SiOH group; however, there can be residual uncrosslinked SiOH groups during preparation. z is the molar ratio of water or other gelling agent to silane and ranges from about 0.5 to about 3.0. $R_f$ is preferably $CF_3$, $C_2F_5$ or $C_3F_7$ for formula VII and $C_6F_{13}$, n-$C_8F17$ and n-$C_{10}F_{21}$ for formulas VIII and IX.

By "fluoropolymer phase" is meant at least one fluoropolymer, wherein fluoropolymer refers to a partially fluorinated or perfluorinated organic polymer or a copolymer generated from at least one partially fluorinated or perfluorinated monomer. The fluoropolymer can be linear or branched but not substantially crosslinked. The fluoropolymer used in the present invention must be substantially soluble in one or more fluorinated solvents. The fluoropolymer can comprise hydrogen, oxygen and/or chlorine substituents provided the fluoropolymer remains substantially soluble in a fluorinated solvent. Fluoropolymers useful in the present invention comprise polytetrafluoroethylene (PTFE), and copolymers derived from tetrafluoroethylene (TFE) and other fluoromonomers such as hexafluoropropylene (HFP); perfluoromethylvinylether; perfluoroethylvinylether; perfluoro(2,3dimethyl dioxole); and hexafluoropropylene oxide. Representative and preferred fluoropolymers are "TEFLON" AF amorphous fluoropolymers, such as "TEFLON" AF 1600 and "TEFLON" AF 1601, each of which is a copolymer derived from TFE and 2,2-bis(trifluoromethyl)-4,5-difluoro-1,3-dioxole, and "TEFLON" AF 2130 which is a terpolymer derived from tetrafluoroethylene, 2,2-bis(trifluoromethyl)-4,5-difluoro-1,3-dioxole and chlorotrifluoroethylene (ClFC=CF$_2$); "KALREZ" perfluoroelastomer, a copolymer derived from TFE and perfluoromethylvinylether (PFVME) plus optionally a cure site monomer terpolymer; and "TEFLON" FEP, a copolymer derived from TFE and hexafluoropropylene (HFP). The most preferred fluoropolymers are the copolymers derived from TFE and HFP; TFE and 2,2-bis(trifluoromethyl)-4,5-difluoro-1,3-dioxole; and TFE and a perfluoroalkylvinylether.

All of the fluoropolymers and the inorganic oxide precursors, or alternatively mixture of inorganic oxide precursors, of the present invention must be soluble in a fluorinated solvent which solvent can be either polyfluorinated or perfluorinated; preferably perfluorinated. Perfluoroaliphatic (e.g., perfluoro(butyl THF)), polyfluoroaliphatic (e.g., $C_3F_7OCHFCF_3$) and perfluoroaromatic (e.g., hexafluorobenzene) solvent systems can be utilized. Preferred solvents comprise perfluoro(butyl THF), also known as "FLUORINERT" FC-75; "FLUORINERT" FC-40, a mixture of perfluorotrialkylamines containing mostly perfluoro(di(n-butyl)methylamine; perfluorophenanthrene, e.g., "FLUTEC" PP-11; $C_8F_7OCHFCF_3$, e.g., "FREON" E1; hexafluorobenzene ($C_6F_6$); perfluoromethylcyclohexane, $C_6F_{11}(CF_3)$; and perfluoro(n-ethylmorpholine). The particular fluoropolymer and inorganic oxide precursor selected for the preparation of a particular fluoropolymer nanocomposite must be soluble in or miscible with a common fluorinated solvent system.

The present invention further provides a process for preparing the fluoropolymer nanocomposite described above. The fluoropolymer nanocomposite can be prepared by contacting at least one fluoropolymer soluble in a fluorinated solvent with at least one inorganic oxide precursor soluble in the fluorinated solvent and an optional gelling agent in the presence of the fluorinated solvent. Mixtures of inorganic oxide precursors where some are soluble in the fluorinated solvent and others are not can be used provided the mixture is soluble in the fluorinated solvent. This can be accomplished in a variety of ways. For example, the fluoropolymer nanocomposite can be prepared by dissolving at least one fluoropolymer, as described above, in a first fluorinated solvent to form a first solution. At least one inorganic oxide precursor, as described above, can then be dissolved in a second fluorinated solvent, which solvent can be and is preferably the same as the first solvent, to form a second solution. If the second solvent is different from the first solvent, the second solution must be soluble in or miscible with the first solution. The first solution is then contacted, for example by mixing, with the second solution. The optional gelling agent can be added either to the first solution, to the second solution, or to the contacted first and second solutions. The gelling agent must be soluble in or miscible with the first solution unless the gelling agent is added to the second solution prior to contact with the first solution.

Polysilicates developed from the above described fluorine-bearing silanes prior to contact with the dissolved fluoropolymer are also efficacious. When polysilicates are used as the inorganic oxide precursor, a gelling agent, such as trifluoroacetic acid which is soluble in a fluorinated solvent, is optional. Also efficacious is treatment of a polysilicate with water vapor at an elevated temperature after film deposition. A gelling agent such as formic acid in tetrahydrofuran (THF) may be used. For example, $C_8F_{17}C_6H_4Si(OCH_3)_3$ can be converted into a polysilicate by reaction of formic acid in THF or methylene chloride and then added to the dissolved fluoropolymer to form the nanocomposite of the present invention.

The inorganic oxide phase is formed within the fluoropolymer phase by allowing the inorganic oxide precursor to partially or fully cross-link. Finally, the resultant fluoropolymer nanocomposite is optionally isolated from residual liquid, byproducts, and unreacted starting materials, usually by drying.

Alternatively, the inorganic oxide precursor can be dissolved in the first solution comprising the fluoropolymer and then contacted with the gelling agent.

The gelling agent is preferably a strong organic carboxylic acid, such as trifluoroacetic acid (TFA), perfluoropropionic acid, or trifluoromethanesulfonic acid. The gelling agent can also be a fluoride ion source, such as guanidium fluoride or CsF. The gelling agent must be soluble in a fluorinated solvent unless the gelling agent is used to prereact the inorganic oxide precursor prior to contact with the dissolved fluoropolymer.

A weight percent ratio of fluoropolymer to inorganic oxide precursor ranging from 1 to 99 is possible. Preferably, a 60 to 90 fluoropolymer to inorganic oxide precursor weight ratio is used. Most preferably, a 80% to 90% fluoropolymer to inorganic oxide precursor weight percent ratio is used.

After contacting the fluoropolymer solution with the inorganic oxide precursor solution or the prereacted inorganic oxide precursor, the mixture is maintained at a temperature within the range of about 0° C. to about 100° C. at ambient pressure.

Gel time varies with the fluoropolymer, amount of gelling agent, fluorinated solvent, inorganic oxide precursor, and temperature selected.

The fluoropolymer nanocomposite of the present invention can be isolated via removal of liquid byproducts and unreacted starting materials, such as solvent, generally by evaporation to yield a monolith glass, gel, film or coating. Drying can be at atmospheric pressure and at a temperature of from about 20° C. to about 225° C. Vacuum up to $10^{-5}$ torr or exposure to water vapor at elevated temperatures may also be employed.

Particles of an inorganic oxide phase resulting from the solution-grown processes of the present invention are substantially smaller than those resulting from simple dispersion of particulate inorganics or from a combination of an aqueous-based sol-gel and a fluoropolymer dispersion. The fluoropolymer nanocomposites of the present invention can comprise continuous inorganic networks which are interpenetrated by linear or branched fluoropolymers. The inorganic oxide phase in the nanocomposites of the present invention can alternatively comprise a particles substantially all of which have a particle size such that when a small angle x-ray procedure described herein is applied to a sample of the nanocomposite, a particle diameter less than about 75 nm is indicated for substantially all of the particles of the inorganic oxide phase.

There are various techniques useful in determining the nature and size of the inorganic oxide phase of the fluoropolymer nanocomposites of the present invention. For example, Small Angle X-ray Scattering (SAXS) can determine the presence of heterogeneities with different scattering cross sections for X-rays. In order to measure the x-ray scattering of the nanocomposite of the present invention, a wet gel was used.

Particle size can be determined by SAXS, according to the following technique: The SAXS data should be acquired on a high-resolution instrument such as the one originally designed by Bonse and Hart, *Zeit. fur Physik,* 189, 151 (1966), and subsequently manufactured commercially by Advanced Metals Research Corporation, Burlington, Mass., as the AMR Model 6-220 X-Ray Low Angle Scattering Goniometer.

Scattered X-ray intensity data are acquired in the range from 8 to 600 seconds of arc (2-theta). The desmeared intensity results can be represented as I(h), where $$\frac{h = 4\pi \sin \theta}{\lambda} = k \times 2\theta.$$

Here, $\theta=(2\theta)/2$ (and $\sin \theta=\theta$ in radians at these small angles) and $\lambda$=the wavelength of CuK$\alpha$ radiation. These intensity results are converted to the "Invariant" argument, $h^2I(h)$, by multiplying each desmeared intensity by the square of the angle of observation for that point.

A plot of the invariant argument will be characterized by having a maximum related to the size of the particles. If the particle size distribution is narrow (nearly monodisperse), the particle diameter is inversely proportional to the position of this maximum: diameter=$4.87/2\theta-°_{max}$ nm. If there is finite breadth to the distribution, the peak position will be shifted to lower angles and the breadth of the distribution must be taken into account For the results cited here, the observed invariant-argument curves were matched to calculated curves derived assuming a model of a log-normal particle-size distribution.

The use of low angle x-ray scattering data to determine presence and size of particulate inclusions in polymers is described in Frank C. Wilson, Materials Research Soc. Vol. 171, Polymer-based Molecular Composites, p. 413(1990), and in U.S. Pat. No. 4,536,541.

Figure 2:
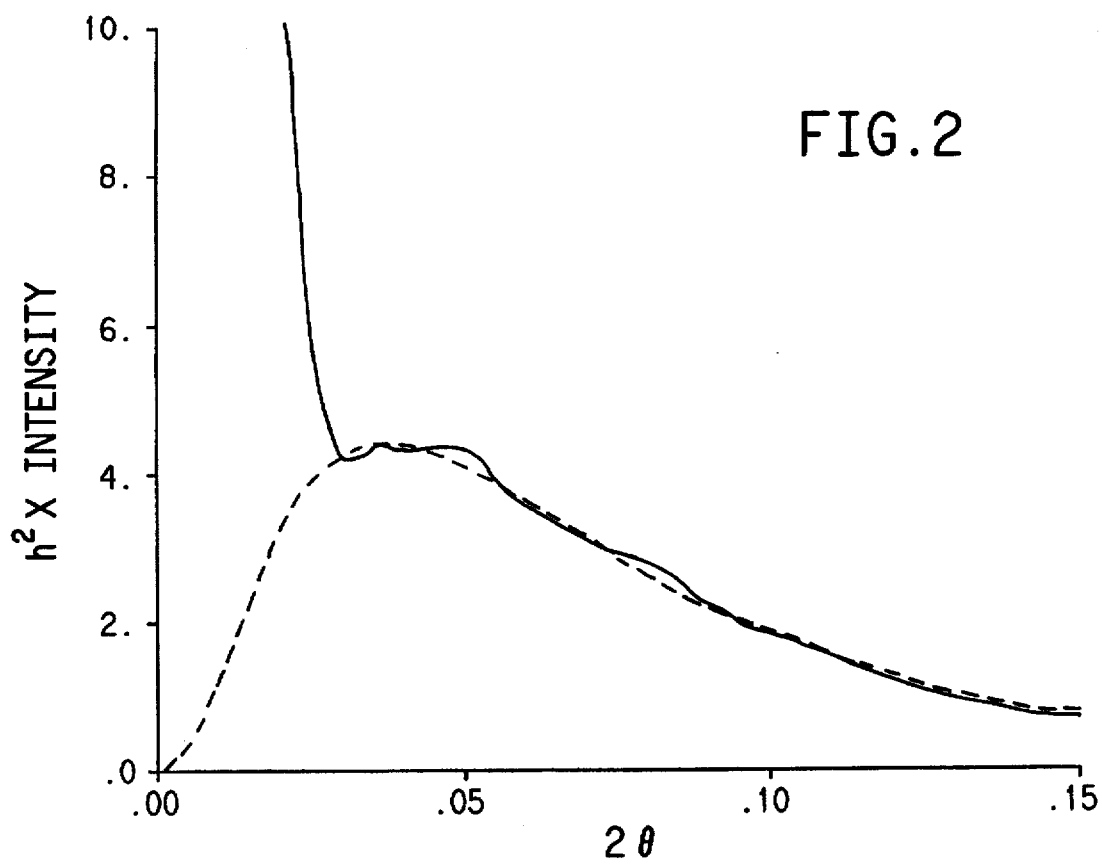
FIG. 2 is a graph showing the x-ray scattering intensity of a composition comprising fumed silica (OX-50), "TEFLON" AF and hexafluorobenzene for determination of particle size distribution. The dashed curve is calculated. (The steeply rising portion at low angle is due to larger particles whose size distribution could not be accurately determined.) Diameter of the smaller particles which could be analyzed=101 nm; poly disp. ratio=1.70; mean=115; $h^2$ refers to the scattering wave vector.

The particle size contained in samples of the fluoropolymer nanocomposite from FES with "TEFLON" AF and of fumed silica (Degussa OX-50) with "TEFLON" AF were determined by SAXS analysis. The scattering curves are shown in FIG. 1. The much higher scattering intensity in the sample with the fumed silica (circles) results from the presence of discrete particles in the liquid. Particle size analysis shown in FIG. 2 indicates a mean particle size in excess of 115 nm. In addition, the strong scattering at the smallest angles indicates that particles larger than 200 nm are present. The data analysis is unable to determine their distribution.

The scattering curve shown in FIG. 1 for a clear nanocomposite gel prepared from FES with "TEFLON" AF at the same concentration of silicon species (squares) shows so little scattering that no assignment of particle sizes is possible and is consistent with a nanocomposite comprising a continuous inorganic network and "TEFLON" AF.

Images and analyses of the fluoropolymer nanocomposite of the present invention can be produced using a Philips CM12 analytical electron microscope available from Philips Electronic Instruments Co., Mahwah, N.J. operated with an LaB6 filament and at 100 kV. The basic instrument is configured for transmission electron microscope (TEM). The machine can also be fitted with an optional accessory system and the appropriate signal detectors for scanning transmission electron microscopy (STEM) and for reflection scanning electron microscopy (SEM), in order to be able to access the additional information, e.g., atomic number or Z-contrast, available from the different modes of operation. The CM12 is also equipped with the Link/Oxford Instruments lo-Z (inc F, C, N, O) capable LZ-5 windowless energy dispersive x-ray spectrometer (EDX/EDS) and the associated eXL analysis system (Oxford instruments, Bucks HP12 3SE, England). Analyses are possible in TEM and more selectively in the STEM mode of operation.

Samples are prepared directly onto carbon filmed 200 mesh copper grid TEM sample supports by dipping them in the suspension and subsequently drying.

The high resolution images can be recorded in TEM at primary magnifications of, for example, 35,000× and 100,000×, and be printed with a further enlargement of 3× for final print magnifications of 105,000× and 300,000×, respectively. The electron beam dose can be restricted with careful manipulation of the experiment, by a 50 um condenser aperture and a small spot size (#5) defocused to fill the field of view. A low light level TV camera is used for focusing, and the photographic exposure times on Kodak 163 film can be 5 to 10 seconds. A small objective aperture size of 20 um can be used with systematic defocus settings of dF=0, −300 and +450 nm to enhance contrast. STEM can be done on the same instrument and samples.

Figure 3:
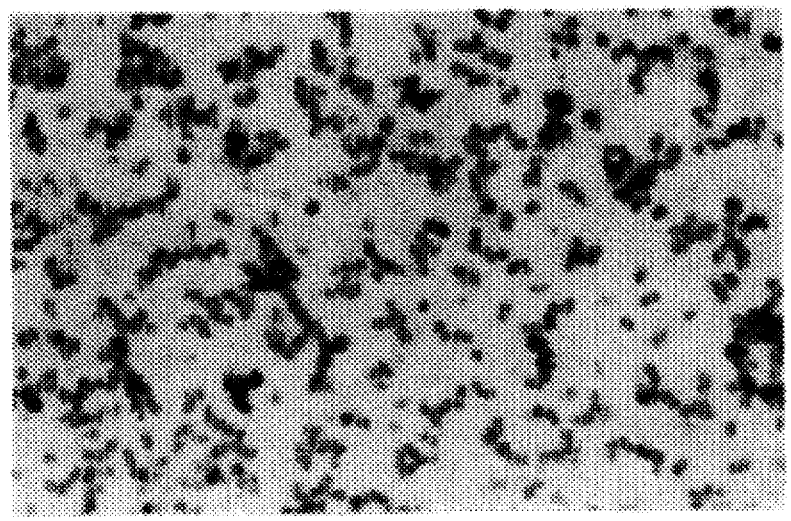
FIG. 3 is a transmission electron microscopy micrograph showing particles of the inorganic oxide phase of a fluoropolymer nanocomposite of the present invention prepared using $Si(OCH_2C_3F_7)_4$ (FBS) and "TEFLON" AF dissolved in perfluoro(butyl THF) (FC-75).
Figure 4:
FIG. 4 is a transmission electron microscopy micrograph showing silica particles of a composition prepared using "TEFLON" AF and OX-50 fumed silica.

FIG. 3 shows the TEM photograph of a fluoropolymer nanocomposite coating prepared from FBS with "TEFLON" AF which indicates uniform, spherical particles ranging from 10 to 15 nm. Analyses of the particles confirmed the presence of the elements Si, C, O and F. Other continuous inorganic oxide networks may also be present but not images. The present invention can be compared to the composition prepared from fumed silica (OX-50) with "TEFLON" AF as shown in the TEM photograph in FIG. 4 which indicates aggregates of large silica particles of the size 100 nm or greater.

The fluoropolymer nanocomposites of the present invention are useful as protective coatings, displaying improved adhesion to substrate surfaces while maintaining low surface energy of the unmodified polymer. Durable, adherent coatings on substrates, such as glass, metal, and ceramic incorporate fluoropolymer surface features such as non-sticking, non-soiling, high lubricity and low chemical reactivity. An example is coating metal molds, e.g., for the manufacture of golf balls. The fluoropolymer nanocomposites of the present invention can function both as primers for fluoropolymer overcoats and stand alone coatings. Both systems have shown improved adhesion to glass and abrasion resistance and are stable to oxidation at 300° C. in air.

The standalone fluoropolymer nanocomposite coatings of the present invention are useful for coating articles requiring anti-fouling, durability, anti-reflective, low dielectric constant, abrasion resistant, chemical resistant, lubricity, release, anti-soiling, anti-staining or reduced surface energy characteristics. These articles can be made of glass; ceramic; amorphous (such as poly(methylmethacrylate)) or crystalline (such as nylon, polyester film, e.g., "MYLAR" polyester film, or polyimide film, e.g., "KAPTON" polyimide film) plastic; rubber such as silicone rubber or nitrile rubber; elastomer such as copolymers of hexafluoropropylene and vinylidene fluoride, e.g., "VITON" elastomer, copolymers of ethylene and methyl acrylate, e.g., "VAMAC" elastomer or copolymers derived from TFE and PFVME plus optional cure site monomers, such as "KALREZ" or "CHEMRAZ" or ethylene/propylene/hexadiene rubber (EPDM); wood; or metal such as stainless steel, copper or brass. For example, the standalone coatings can be used to coat a variety of articles, such as lined reactor vessels, heat exchangers, shower doors, shower heads, lenses, head lamps, mirrors, auto windshields, optoelectronic display devices such as cathode ray tubes (TV screens, rear projection screens, radar screens and computer monitors) and flat panel displays (liquid crystal displays, light emitting diodes, electroluminescent panels, plasma display panels and vacuum fluorescent displays), circuit boards, cable, wire, interlayer dielectrics for electronic devices, automotive surfaces, statuary, architectural buildings and panels, the interior of tubing, oven and microwave glass, laboratory glassware, vials for pharmaceuticals, o-rings, gaskets and stainless steel for preserving appearance. Multilayer coatings wherein a primer coat comprises the fluoropolymer nanocomposite of the present invention can also be used to coat the articles named above.

The multilayer coatings of the present invention wherein a primer coat comprises the fluoropolymer nanocomposite of the present invention, are useful for coating articles requiring, for example, abrasion resistant or scratch resistant, anti-reflective, anti-fouling, chemical resistant, release, lubricity, anti-soiling, anti-staining, low dielectric constant or reduced surface energy characteristics. These articles can be made of glass, ceramic, amorphous or crystalline plastic, rubber, elastomer, wood or metal such as stainless steel, copper or brass. For example, the multilayer coatings can be used to coat bearings, metal containers, ducts, valves, wire, metal foil, boilers, pipes, ship bottoms, oven liners, iron soleplates, metal cookware such as frypans and rice cookers, snow shovels and plows, chutes, conveyors, dies, tools such as saws, files and drills, hoppers and other industrial containers and molds. The standalone coatings of the present invention can also be used to coat these same articles.

Coating the substrate via dip, flow or spray coating methods can be provided by contacting the substrate with the fluoropolymer/inorganic oxide precursor solution prior to gelation, with subsequent drying and optional heating up to about 350° C. The coating solution can be heated at a temperature ranging from about room temperature to about the boiling point of the solvent, or to 100° C. prior to coating. Coating thicknesses range from about 100 Å to about 1 μ.

Dip coating from solutions comprising the fluoropolymer, the inorganic oxide precursor and gelling agent in a fluorinated solvent onto glass slides, followed by an optional overcoat comprising same or another fluoropolymer, can give optically transparent films. After curing at temperatures ranging from about 25° C. to about 320° C., these slides show low surface energies as measured by advancing hexadecane contact angles of greater than 50°. The films generally show good adhesion surviving 30 min in boiling water followed by a tape pull. For example, good results in an aliphatic fluorinated solvent were obtained using a dioxolane silane inorganic oxide precursor or a silane solution comprising 1:1 dioxolane silane and $HSi(OCH_2C_3F_7)_4$ (HFBS) as the inorganic oxide precursors and a copolymer of TFE and 2,2-bis(trifluoromethyl)-4,5-difluoro-1,3-dioxole ("TEFLON" AF) as the fluoropolymer. Hexadecane advancing contact angles near or greater than 60° after boiling were realized. (The hexadecane advancing contact angle of PTFE is about 45°.)

Surface energy is measured herein via contact angle measurements using the sessile drop method, wherein the surface energy of a sample is related to the contact angle θ according to the equation: $\cos\theta = -1 + 2(\gamma_1^d \gamma_s^d)^{1/2}/\gamma_1^d$, where the superscript d refers to the dispersive component of the liquid or solid free energies γ, l=liquid, and s=solid. For a given fluid, the higher the contact angle, the lower the surface energy of the solid. (See S. Wu, *Polymer Interface and Adhesion*, Chapter 8, Marcel Dekker, Inc., New York, N.Y., 1982 and B. Sauer, J. of Adhesion Science, Vol. 6, p. 955(1992)).

Adhesion is generally measured herein using the standard ASTM test method D3359. The method covers procedures for assessing the adhesion of coating films to metallic substrates by applying and removing pressure-sensitive tape over cuts made in the film.

Figure 5:
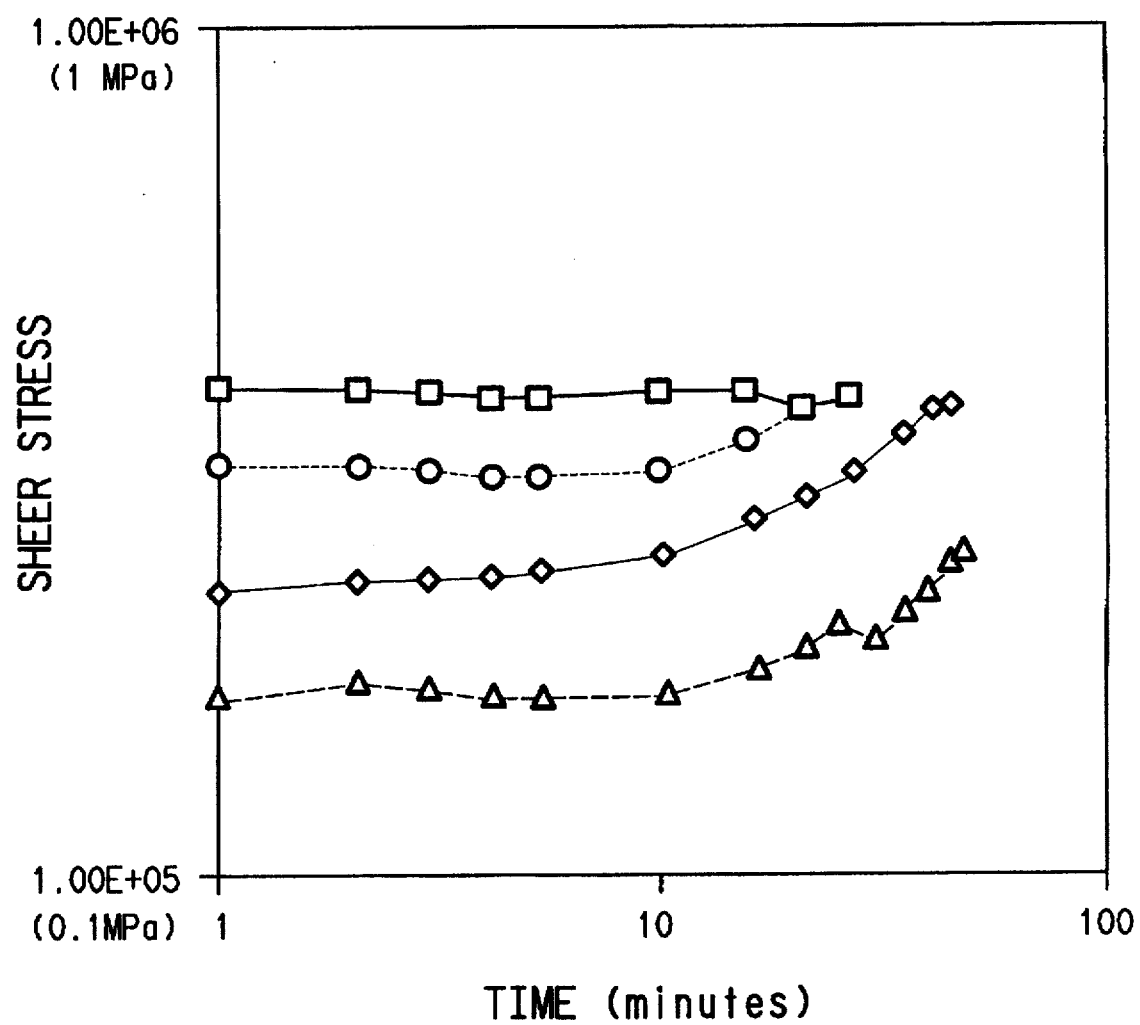
FIG. 5 is a graph showing the results of an extrusion of an abrasive polyethylene through stainless steel capillary dies coated with a fluoropolymer nanocomposite of the present invention (circles) (Example 27), an uncoated control (squares) (Control A: Example 26), fluoropolymer applied as a top coat over the fluoropolymer nanocomposite (triangle) (Example 28), and a fluoropolymer coated capillary die control (diamond) (Control C: Example 28). The fluoro polymer nanocomposite is prepared using a copolymer of tetrafluoroethylene (TFE) and 2,2-bis(trifluoromethyl)-4,5-difluoro-1,3-dioxole, (i.e., "TEFLON" AF 1601) and $(C_3F_7CH_2O)_3SiCH_2CH_2(CF_2)_6CH_2CH_2Si(OCH_2C_3F_7)_3$. Improvements in extrudability (less shear stress) and abrasion resistance can be observed comparing the fluoropolymer nanocomposite (circles) and the nanocomposite used as a primer with a fluoropolymer top coat (triangle) with the respective control samples. The topcoat is a copolymer of TFE and hexafluoropropylene (HFP) (i.e., "TEFLON" T9050, a "TEFLON" FEP copolymer) which has a melting point of 260° C. and contains 15% HFP.

As is shown in the Examples and FIG. 5, fluoropolymer nanocomposites of the present invention display improved abrasive resistance. After coating an extrusion die with a primer solution of a fluoropolymer nanocomposite of the present invention followed by a top coat of a fluoropolymer and extruding abrasive material through the die, an improvement in the performance and the durability of the fluoropolymer top coat is shown. Preferred fluoropolymer topcoats comprise copolymers derived from tetrafluoroethylene (TFE), such as TFE and bis 2,2-(trifluoromethyl)-4,5-difluoro-1,3-dioxole; TFE and hexafluoropropylene; and TFE and a perfluoroalkylvinylether.

EXAMPLES

All reactions with air-sensitive materials were carried out in a Vacuum Atmospheres Co. dry box or under nitrogen. In the examples that follow, all commercial reagents were distilled prior to use. Tetrachlorosilane, trichlorosilane, vinyltrichlorosilane, allyltrichlorosilane 1,3,5,7-tetramethylcyclotetrasilane, tetrakis(dimethylsiloxy)-silane, 1,1,3,3-tetramethyldisiloxane, and pentamethylcyclopentasiloxane and trifluoroacetic acid were purchased from Aldrich Chemical Co., Milwaukee, Wisc., United Techologies Inc., Bristol, Pa. or PCR Inc., Gainesille, Fla. $Si(OCH_2CF_3)_4$, $Si(OCH_2(CF_2)CF_3)_4$, $HSi(OCH_2CF_3)_3$, and $CH_2=CHSi(OCH_2CF_3)_3$ were synthesized by slight modifications of published procedures. Platinum divinylsiloxane complex (3–3.5% Pt concentration in xylene, Huls $PC_{072}$) was obtained from Huls America inc. and diluted 5:1; by volume (toluene, Pt complex) prior to use. Toluene was reagent grade and purified by distillation from calcium hydride prior to use. Tetraallylsilane was snythesized by a modification of a published procedure (J. Organomet. Chem., 84(1975), pg 199–229). Vinylpolyfluoroalkanes; trans-divinylperfluoro-1,3-dioxolanes; all of the "TEFLON" AF, "TEFLON" FEP, and "KALREZ" fluoropolymers; zirconia, crystalline Nylon 6,6; "NOMEX" aramid paper, oxygen plasma-treated "MYLAR" polyester film; "KAPTON" polyimide film; silicone rubber; "NORDEL" rubber, "VAMAC" elastomer, or "VITON" elastomer, polymethylmethacrylate; copper and brass were obtained from E. I. du Pont de Nemours and Company, Wilmington, Del. "CHEMREZ" elastomer, EPDM rubber and nitrile rubber were obtained from Greene, Tweed and Co., Kulpville, Pa. Gold sputtering was performed using a Denton Vacuum Desk II sputterer (Cherry Hill, N.J.) with a sputtering time of 360 seconds. "FLUTEC" and "FLUORINERT" solvents were obtained from PCR, inc., Gainsville, Fla. "FLUTEC" solvent is also available from Rhone-Poulenc in France. The mass spectroscopy experiments were performed on a Finnigan 4615B GC/MS quadrupole mass spectrometer (San Jose, Calif.). An electron impact source configuration operating at 200° C. and a source pressure of $1.0 \times 10^{-6}$ Torr was used. The mass spectrometer was scanned at a rate of about 1000 Daltons/second. All mass spectral peaks are recorded as the sum of the ion plus potassium (M+39). Proton and carbon NMR were determined in deuterobenzene solvent on a GE model QE-300 instrument.

Abbreviations
Et—ethyl
FBS=tetra(heptafluorobutoxy)silane, $Si(OCH_2C_3F_7)_4$
FBS-PDD=bis(tri(heptafluorobutoxy)silylethyl)-2,2-bis(trifluoromethyl)-4,5-difluoro-1,3-dioxolane
FBS-Star 16=$(C_3F_7CH_2O)_3SiCH_2CH_2(CF_2)_6CH_2CH_2Si(OCH_2C_3F_7)_3$
FC-75=perfluoro(butyl THF)
FES=tetra(trifluoroethoxy)silane, $Si(OCH_2CF_3)_4$
FOES=$F(CF_2)_6CH_2CH_2Si(OCH_2CH_3)_3$
FStar 3=$Si[OSiMe2CH_2CH_2Si(OCH_2C_3F_7)_3]_4$
HFB=hexafluorobenzene
HFBS=tri(heptafluorobutoxy)silane, $HSi(OCH_2C_3F_7)_3$
HFP=$CF_3CF=CF_2$
Me=methyl
PDD=2,2-bis(trifluoromethyl)-4,5-difluoro-1,3-dioxole PFPS=$C_8F_{17}C_6H_4Si(OCH_3)_3$
PFVME=$CF_2$=CF—$OCF_3$
PMMA=poly(methylmethacrylate)
PP-11=perfluoro phenanthrene
PS=polysilicate
tape=Scotch 898 brand
TEOS=$Si(OCH_2CH_3)_4$, tetraethoxysilane
TFA=trifluoroacetic acid, $CF_3COOH$
THF=tetrahydrofuran
SAXS=Small Angle X-ray Scattering

EXAMPLE 1

Adhesion promotion in "TEFLON" AF in HFB 0.123 g of "TEFLON" AF 1600 was dissolved in 12.019 g hexafluorobenzene (HFB). A second solution of tetra (trifluoroethoxy)silane (FES) (0.065 g) and HFB (3.004 g) was prepared. A portion of the FES solution (2.006 g) was added to a portion of the "TEFLON" AF 1600 solution (1.997 g) while it was being magnetically stirred. After the silane/"TEFLON" AF solution had stirred for 3 min. at room temperature, a third solution of trifluoroacetic acid (TFA) (0.026 g) in HFB (0.123 g) was dripped into it while magnetically stirring. The combined solution was clear and fluid. This solution was used to dip coat a glass microscope slide at a withdrawal rate of 14.6 mm/min. Assuming all the silane is converted into a network polysilicate approximating silica in its composition, the film was 14% silica by weight. The sample was air dried, then heated in air to 200° C. for 60 min. After cooling, the sample was analyzed for surface energy by measuring the contact angle of the low energy fluid hexadecane on the surface, using the sessile drop method. The advancing contact angle was 60°, higher than that for poly(tetrafluoroethylene) of 45°. The sample was then subjected to boiling water for 10 min, and the contact angle remeasured after drying. The advancing angle for hexadecane was 53°.

EXAMPLE 2

Adhesion promotion in "TEFLON" FEP with $C_8F_{17}C_6H_4Si(OCH_3)_3$ Polysilicate $C_8F_{17}C_6H_4Si(OCH_3)_3$ was converted into a polysilicate by reaction with an 8.8 molar excess of formic acid in tetrahydrofuran (THF). After 66 min., the solvents and volatile products were removed, leaving a white solid residue. The residue was dissolved at 110° C. in perfluorophenanthrene (PP-11) containing 1.8% by weight "TEFLON" FEP. The combined solution was clear and fluid. The dissolved solids comprised 60% "TEFLON" FEP and 40% polysilicate by weight. This solution was used to flow coat a glass microscope slide. The sample was air dried, then heated in air to 320° C. for 98 min. The film was cut into cross-hatch squares (per ASTM D3359, except that boiling water was not used) and subjected to a pull by adhesive tape. None of the squares were removed by the tape.

EXAMPLE 3

Adhesion promotion in "TEFLON" AF in FC-75 solvent $C_8F_{17}C_6H_4Si(OCH_3)_3$ was converted into a polysilicate by reacting 725 mg of $C_8F_{17}C_6H_4Si(OCH_3)_3$ with a 3.0 molar excess (407 mg) of TFA with no other solvent present. After 75 min. the solution had phase separated into two layers. 922 mg perfluoro(butyl THF) (FC-75) was added to resolubilize the polysilicate. 399 mg of this solution was added to 1404 mg of a 2% by weight solution of "TEFLON" AF 1600 in FC-75. The resultant solution was used to make a flow coating on a glass microscope slide. The air-dried coating was heated to 120° C. for 18 min, cooled and subjected to an adhesive tape test (not cross hatched). The coating was unaffected by the tape pull.

EXAMPLE 4

Comparative Example: Pure "TEFLON" AF in FC-75 Solvent

A coating was made as in Example 3 except that pure "TEFLON" AF 1600 in FC-75 (2%) was used. After heating to 120° C. for 18 min and cooling, the coating was completely removed by the adhesive tape.

EXAMPLE 5

Adhesion promotion in "KALREZ" with POlysilicate from $Si(OSi(CH_3)_2CH_2CH_2Si(OCH_2C_3F_7)_3)_4$ $Si(OSi(CH_3)_2CH_2CH_2Si(OCH_2C_3F_7)_3)_4$ was converted into a polysilicate by reaction with a 7.0 molar excess of TFA in FC-75. The solution remained clear for several days after mixing. After nine days, 442 mg of this solution was added to 3.904 g of a 2% by weight solution of "KALREZ" 4000APS in FC-75. The resultant solution was used to make a flow coating on a glass microscope slide. The calculated composition of the film was 52% "KALREZ", 48% silicate by weight. The transparent, air-dried coating was heated to 150° C. for 15 min, cooled and subjected to an adhesive tape test (cross hatched) and submersion in boiling water for 10 min. The coating was nearly unaffected by the tape pull and suffered some detachment from the substrate after the immersion in the water.

EXAMPLE 6

Comparative Example; Pure "KALREZ" in FC-75 Solvent

A coating was made as in Example 5 except that pure "KALREZ" in FC-75 (2%) was used. The dried coating was easily completely removed from the substrate with tape (no cross hatching) or by 30 sec. immersion in boiling water.

EXAMPLE 7

Adhesion promotion of "KALREZ" With FES 135 mg FES and 73 mg TFA were added to 13.33 g HFB. The clear solution was added to 6.73 g of a 1% solution of "KALREZ" in HFB. The combined solution was heated to 35° C. until it completely clarified. A dip coating on glass was made 44 hours later at a withdrawal rate of 92 mm/min. The film was heated to 200° C. for 60 min., then submersed in boiling water for 10 min. The film was intact and showed a hexadecane contact angle of 43°.

EXAMPLE 8

Small Angle X-Ray Scattering (SAXS) Comparison of FES and "TEFLON" AF with OX-50 and "TEFLON" AF SAXS of FES with "TEFLON"

3.795 g of a 6.01% "TEFLON" AF 2130 in HFB solution was prepared. A second solution of FES (335 mg) and HFB (626 mg) was made and added to the "TEFLON" AF/HFB solution with magnetic stirring. A third solution of TFA (438 mg) in HFB (680 mg) was made and added to "TEFLON" AF/FES/HFB solution with magnetic stirring. This resultant transparent solution was used to fill 1.0 mm glass tube for SAXS. The tube was sealed with epoxy resin and allowed to form clear gels (usually in several days). The inorganic content at the gel point is calculated to be 17.4% by weight. The tube was then subjected to SAXS analysis on a Kratky camera over the range 2θ=0.6 to 4.0 degrees. Very small angle data (2θ down to 0.002°) were obtained on a Bonse-Hart instrument. The wavelength of the radiation was 1.54 Å.

SAXS of OX-50 and "TEFLON" AF 10.00 g of a "TEFLON" AF 2130 solution in HFB (6.01%) was prepared. 130 mg of fumed silica (OX-50, from the Degussa Co., Frankfurt, Germany) was added to the "TEFLON" AF/HFB solution with magnetic stirring. The silica added was 17.8% of the total solids. After stirring for 5 minutes it was homogenized using a Kinematica GmbH PT10/35 unit available from Kinematica GmbH, Germany, for 30 seconds. The resultant opaque suspension was used to fill 1.0 mm tubes for SAXS, as described above.

The scattering curves for the two samples are shown in FIG. 1. The much higher scattering intensity in the sample with the fumed silica results from the presence of discrete particles in the liquid and indicate a mean particle size in excess of 115 nm. The scattering curve for the nanocomposite comprising FES with "TEFLON" AF at the same concentration of silicon species shows so little scattering that no assignment of particle sizes is possible.

EXAMPLE 9

Adhesion promotion Of "TEFLON" AF using FBS-PDD/HFBS/"TEFLON" AF primer in FC-75

A mixture of 1:1 molar FBS-PDD and HFBS (24 mg) and 3.5 mg of TFA were added to 1.25 g of a 6% "TEFLON" AF 1601S stock solution diluted in 13.75 g of FC-75. This resulted in a solution consisting of 0.5% "TEFLON" AF 1601S and 0.1% silanes. The solution was allowed to stand for 72 hours. This solution was used to dip coat glass microscope slides at a withdrawal rate of 14.6 mm/min. After the first coat, all slides were dried at 150° C. for 30 min. A second coat of solution was applied and dried under the same conditions. The final coating was from a 0.5% "TEFLON" AF 1600 solution in FC-75. The slides were then heated to 150° C. for 30 min followed by 225° C. for 30 min. After cooling, the sample was analyzed for surface energy by measuring the contact angle of the low energy fluid hexadecane on the surface, using the sessile drop method. The advancing contact angle was 66°, higher than that for poly(tetrafluoroethylene) which is 45°. The sample was then subjected to boiling water for 30 min, and the contact angle remeasured after drying. The advancing angle for hexadecane was 62°. The samples were subjected to an adhesive tape test (not cross hatched). The coating was unaffected by the tape pull. Similar slides containing no "TEFLON" AF topcoat gave advancing contact angles of 70°. After boiling for 30 min, the advancing angle was 58°.

The concentration of 1:1 FBS-PDD/HFBS was lowered relative to "TEFLON" AF to see what effect this would have on adhesion. Glass slides were dip coated from a solution consisting of 0.5% "TEFLON" AF and 0.04% FBS-PDD/HFBS in FC-75 as described above. Some slides contained an additional top coat of 0.5% "TEFLON" AF 1600. After cooling, the samples were analyzed by contact angle measurements. The advancing hexadecane contact angle for all slides, with or without a "TEFLON" AF topcoat, was 67°–68°. After boiling for 30 min, the advancing angle for all slides was 630°65°.

EXAMPLE 10

Thermal Stability of Coatings using FBS-PDD/HFBS/"TEFLON" AF Solution in FC-75

To determine the stability of the coatings in the previous example to oxidation, slides containing one and two layers of the silane/"TEFLON" AF solution with or without an additional topcoat of "TEFLON" AF were subjected to heating in air at 300° C. for one hour. The hexadecane advancing angles for the slides containing silane/"TEFLON" AF coatings were 62°65°. After oxidation the advancing angles were 70° indicating the coatings were still intact and unchanged. The hexadecane advancing angles for the slides containing the "TEFLON" AF topcoats were 68°. After oxidation the advancing angle was 67°.

EXAMPLE 11

Adhesion promotion of "TEFLON" AF using FBS-PDD/HFBS/"TEFLON" AF primer in HFB

A solution consisting of 0.014 g of FBS-PDD, 4 mg of TFA, 0.062 g of "TEFLON" AF 1601 in 12.34 g of hexafluorobenzene was prepared and allowed to stand for 1 hr. Glass microscope slides were dip coated first using this solution, heated, dip coated again with 0.5% "TEFLON" AF 1601 solution and heated as described in the previous example. After cooling, the samples were analyzed by contact angle measurements. The advancing contact angle for hexadecane was 66°. After boiling the sample for 30 min, the advancing angle was 59°. The coating was unaffected by the tape pull.

EXAMPLE 12

Adhesion promotion of "TEFLON" AF using FBS-PDD/HFBS/"TEFLON" AF primer in "FREON" E1

A solution consisting of 0.018 g of FBS-PDD, 4.2 mg of TFA, 0.063 g of "TEFLON" AF 1601 in 12.60 g of $C_3F_7CHFCF_3$ (e.g., "FREON" E1) was prepared and allowed to stand for 1 hr. Glass microscope slides were dip coated first using this solution, heated, dip coated again with 0.5% "TEFLON" AF 1601 solution and heated as described in the previous example. After cooling, the samples were analyzed by contact angle measurements. The advancing contact angle for hexadecane was 65°. After boiling for 30 min, the advancing angle was 62°. The coating was unaffected by the tape pull.

EXAMPLE 13

Adhesion promotion of "TEFLON" AF using FBS-PDD/HFBS/"TEFLON" AF primer in perfluoro (methylcyclohexane)

A solution consisting of 0.018 g of FBS-PDD, 4.3 mg of TFA, 0.066 g of "TEFLON" AF 1601 in 13.11 g of perfluoro (methylcyclohexane) was prepared and allowed to stand for 1 hr. Glass microscope slides were dip coated using this solution as described in the previous examples. After cooling, the samples were analyzed by contact angle measurements. The advancing contact angle for hexadecane was 65°. After boiling for 30 min., the advancing angle was 54°, and the surface of the slide appeared spotty. The coating was unaffected by the tape pull.

EXAMPLE 14

Adhesion promotion of "TEFLON" AF using FBS-PDD/HFBS/"TEFLON" AF primer in perfluoro(n-ethylmorpholine)

A solution consisting of 0.020 g of FBS-PDD, 3 mg of TFA, 0.103 g of "TEFLON" AF 1601 in 20.016 g of perfluoro(n-ethylmorpholine) was prepared and allowed to stand for 1 hr. Glass microscope slides were dip coated using this solution as described in the previous examples. After cooling, the samples were analyzed by contact angle measurements. The advancing contact angle for hexadecane was 67°. After boiling for 30 min, the advancing angle was 63°. The coating was unaffected by the tape pull.

EXAMPLE 15

Adhesion promotion Of "TEFLON" AF using FBS-PDD/"TEFLON" AF primer in FC-75

FBS-PDD (0.0185 g; 0.012 mmol) and 3.7 mg (0.032 mmol) of TFA was added to 13.5 g of a 0.5% "TEFLON" AF 1601 stock solution in FC-75. The solution was allowed to sit overnight. Glass microscope slides were dip coated using this solution as described in the previous example. After cooling, the samples were analyzed by contact angle measurements. The advancing hexadecane contact angle was 65°. After boiling for 30 min, the advancing angle was 57°. The coating was unaffected by the tape pull.

EXAMPLE 16

Adhesion promotion in "TEFLON" AF using FES/"TEFLON" AF primer in FC-75, with or without "TEFLON" AF topcoat FES (0.022 g) was added to 13.51 g of a 0.5% "TEFLON" AF 1601 stock solution in FC-75 and stirred. TFA (2.4 mg) was added, and the solution stirred for about one hr, then filtered before use to remove a slight precipitate. Glass microscope slides were dip coated using this solution and heated. Some samples were further dip coated from a 0.5% "TEFLON" AF solution in FC-75 and heated as described previously. After cooling, the samples was analyzed by contact angle measurements. The advancing hexadecane contact angle for the single layer coating was 68°, and for the double layer coating was 69°. After boiling for 30 min, the advancing angle for the single layer was 31° and for the double layer coating was 39°. Both coatings were unaffected by the tape pull.

EXAMPLE 17

Adhesion promotion in "TEFLON" AF using FBS/"TEFLON" AF primer in FC-75, with or without "TEFLON" AF topcoat $Si(OCH_2C_3F_7)_4$ (FBS) (0.018 g) was added to 13.50 g of a 0.5% "TEFLON" AF 1601 stock solution in FC-75 and stirred. TFA (1.3 mg) was added, and the solution stirred for about one hr, then filtered before use to remove a slight precipitate. Glass microscope slides were dip coated using this solution as described in the previous example. After cooling, the samples were analyzed by contact angle measurements. The advancing hexadecane contact angle for the single layer coating was 65°, and for the double layer coating was 67°. After boiling for 30 min, the advancing angle for the single layer was 40° and for the double layer coating was 51°. Both coatings were unaffected by the tape pull.

EXAMPLE 18

Adhesion promotion in "TEFLON" AF using FBS-Star 16/"TEFLON" AF primer in FC-75

$(C_3F_7CH_2O)_3SiCH_2CH_2(CF_2)_6CH_2CH_2Si(OCH_2C_3F_7)_3$ (FBS-Star 16) (0.019 g) was added to 13.57 g of a 0.5% "TEFLON" AF 1601 stock solution in FC-75 and stirred. TFA (1.2 mg) was added, and the solution stirred for about one hr. Glass microscope slides were dip coated first using this solution, heated, dip coated again with 0.5% "TEFLON" AF 1601 solution and heated as described previously. After cooling, the samples were analyzed by contact angle measurements. The advancing hexadecane contact angle for the single layer coating was 67°, and for the double layer coating was 69°. After boiling for 30 min, the advancing angle for the single layer was 43° and for the double layer coating was 47°. Both coatings were unaffected by the tape pull.

EXAMPLE 19

Adhesion promotion in "TEFLON" AF using FBS-Star 16/FBS/"TEFLON" AF primer in FC-75

FBS-Star 16(12 mg), FBS (10 mg), and TFA (6 mg) were added to 20.01 g of a 0.5% "TEFLON" AF 1601 stock solution in FC-75. The solution was allowed to stand for 1 hr. Glass microscope slides were dip coated first using this solution, heated, dip coated again with 0.5% "TEFLON" AF 1601 solution and heated as described in the previous example. After cooling, the samples were analyzed by contact angle measurements. The advancing contact angle for hexadecane was 70°. After boiling for 30 min, the advancing angle was 63°. The coating was unaffected by the tape pull.

EXAMPLE 20

Adhesion promotion of "TEFLON" AF using FBS-PDD/FOES/"TEFLON" AF primer in FC-75

FBS-PDD (0.010 g), $F(CF_2)_6CH_2CH_2Si(OCH_2CH_3)_3$ (FOES) (0.004 g) and 4 mg of TFA were added to 14.0 g of a 0.5% "TEFLON" AF 1601 stock solution in FC-75. Glass microscope slides were dip coated using this solution as described in the previous example. After cooling, the samples were analyzed by contact angle measurements. The advancing contact angle for hexadecane was 67°. After boiling for 30 min, the advancing angle was 63°. The coating was unaffected by the tape pull.

EXAMPLE 21

Adhesion promotion of "TEFLON" AF using FBS/FOES/"TEFLON" AF primer in FC-75

FOES (10 mg), 10 mg of FBS and 9 mg of TFA were added to 17.01 g of a 0.5% "TEFLON" AF 1601 stock solution in FC-75. Glass microscope slides were dip coated using this solution as described in the previous examples. After cooling, the samples were analyzed by contact angle measurements. The advancing contact angle for hexadecane was 70°. After boiling for 30 min, the advancing angle was 56°. The coating was unaffected by the tape pull.

EXAMPLE 22

Adhesion promotion in "TEFLON" AF using FBS-Star 16/FOES/"TEFLON" AF primer in FC-75

FBS-Star 16 (9 mg), FOES (4 mg), and TFA (5 mg) were added to 13.01 g of a 0.5% "TEFLON" AF 1601 stock solution in FC-75. The solution was allowed to stand for 1 hr. Glass microscope slides were dip coated using this solution as described in the previous examples. After cooling, the samples were analyzed by contact angle measurements. The advancing contact angle for hexadecane was 67°. After boiling for 30 min, the advancing angle was 61°. The coating was unaffected by the tape pull.

EXAMPLE 23

Adhesion promotion in "TEFLON" AF using FOES/"TEFLON" AF primer in FC-75

FOES (19.6 mg; 0.032 mmmol) and 15.3 mg (0.134 mmol) of TFA was added to 13.50 g of a 0.5% "TEFLON" AF 1601 stock solution in FC-75. The solution was allowed to sit overnight. Glass microscope slides were dip coated using this solution as described in the previous examples. After cooling, the samples were analyzed by contact angle measurements. The advancing contact angle for hexadecane was 67°. After boiling for 30 min, the advancing angle was 55°. The coating was unaffected by the tape pull.

EXAMPLE 24

Adhesion promotion in "TEFLON" AF using FBS-PDD/HFBS/"TEFLON" AF Primer in FC-75

A 1:1 molar mixture of FBS-PDD and HFBS (19 mg) and TFA (3 mg) were added to 19.01 g of a 0.5% "TEFLON" AF 1601 stock solution in FC-75. The solution was allowed to stand for 1 hr. Cleaned poly(methylmethacrylate) (PMMA) samples (1"×2") were dip coated using this solution as described in the previous examples. After dip coating, the samples were air dried overnight. The samples were analyzed by contact angle measurements. The advancing contact angle for hexadecane was 68°. After boiling for 30 min, the advancing angle was 64°. The coating was unaffected by the tape pull.

EXAMPLE 25

Improved Performance and Durability of "TEFLON" AF on tungsten carbide capillary die Using FBS-PDD/HFBS/"TEFLON" AF coatings The inside surface of a cleaned tungsten carbide capillary die was coated with a solution comprising 1.0% "TEFLON" AF 1601 and 0.2% FBS-PDD/HFBS in FC-75 made similar to those described in Example 9 The coating was dried for 2 hr. at 250° C. Linear low density polyethylene containing 2.5 wt. % silica filler was extruded through the coated capillary using an Instron capillary rheometer for a period of two hours at 220° C. at a constant shear rate. The time required to remove the coating was nearly 100 min as compared to 30 min observed for a capillary coated from a 1.0% solution of "TEFLON" AF 1601 in FC-75.

EXAMPLE 26

Control A: Extrusion of abrasive polyethylene through stainless steel capillary die A stainless steel capillary die of size 0.05 cm×2.5 cm×180° was cleaned by heating to red heat with a propane torch. After cooling to room temperature, a linear low density polyethylene with a melt index of 1 g/10 min, containing 2.5 wt % of a silica filler, was extruded through the die using an Instron Capillary Rheometer available from Instron Corp., Canton, Mass. 02021. The shear stress required to extrude the polyethylene at 220° C. at a shear rate of 704 $s^{-1}$ was 0.50 MPa. The extrusion was performed at a constant shear rate of 704 $s^{-1}$ for a period of two hours. During this period, the shear stress remained constant at 0.50 MPa. The surface of the extrudate was rough and distorted throughout the test.

Control B: Extrusion of abrasive polyethylene through stainless steel capillary die that has been coated with Teflon AF from solution The stainless steel capillary die of Control A was cleaned by heating to red heat with a propane torch. After cooling to room temperature, the inside surface of the capillary was coated with a 3% solution of Teflon AF 1601 dissolved in "FLUORINERT" FC-75. The coating was dried for 2 hours at 250° C. The linear low density polyethylene of Control A, which contained 2.5 wt % of a silica filler, was extruded through the coated capillary for a period of two hours at 220° C. and at a constant shear rate of 704 $s^{-1}$. The shear stress required to extrude the polyethylene through the coated die was 0.30 MPa at the start of the extrusion. The shear stress remained constant for a period of about 10 minutes and then increased to 0.50 MPa after a total of about 20 minutes. The shear stress then remained constant at 0.50 MPa for the duration of the test. The surface of the extrudate was smooth at the start of the extrusion but became rough after about 20 minutes.

This example shows that a coating of "TEFLON" AF on an extrusion die acts as a processing aid for the extrusion of linear low density polyethylene. The "TEFLON" coating allows the polyethylene to be extruded at a lower extrusion pressure (lower shear stress) and results in an extrudate with better surface appearance. However, the "TEFLON" coating is removed from the surface of the die by abrasion during the extrusion process.

Example

Extrusion of abrasive polyethylene through stainless steel capillary die coated with "TEFLON" AF/FBS-Star 16 primer and top coat of "TEFLON" AF The stainless steel capillary die of Control B was cleaned by heating to red heat with a propane torch. After cooling to room temperature, the inside surface of the capillary was coated with a solution of 1% "TEFLON" AF and 0.2%, $(C_3F_7CH_2O)_3SiCH_2CH_2(CF_2)_6CH_2CH_2Si(OCH_2C_3F_7)_3$ dissolved in "FLUORINERT" FC-75. The coating was dried 2 hours at 250° C. This primer coating was then top coated with a 3% solution of "TEFLON" AF 1601 dissolved in "FLUORINERT" FC-75. The top coat was dried for 2 hours at 250° C. The linear low density polyethylene of Control A, which contained 2.5 wt % of a silica filler, was extruded through the coated capillary for a period of two hours at 220° C. and at a constant shear rate of 704 $s^{-1}$. The shear stress required to extrude the polyethylene was 0.22 MPa at the start of the extrusion. The shear stress remained constant for a period of about 10 minutes and then increased to 0.50 MPa after a total of about 40 minutes. The shear stress then remained constant at 0.50 MPa for the duration of the extrusion. The surface of the extrudate was smooth at the tart of the extrusion but became rough after about 40 minutes.

This example shows that the coating of a primer, consisting of a solution of "TEFLON" AF and a fluorosilane, followed by a top coat of a "TEFLON" AF onto an extrusion die improves the performance and the durability of the "TEFLON" AF top coat as a processing aid. The improved performance of this primer and topcoat demonstrates that it can be useful in durable coatings in, for example, molds, ducts and in cookware items such as fry pans.

EXAMPLE 27

Improved Performance and Durability of Fluoronano-composite Coatings on Stainless Steel Capillary Dies The stainless steel capillary die of Example 26 was cleaned by heating to red heat with a propane torch. After cooling to room temperature, the inside surface of the capillary was coated with a solution consisting of 1.0% "TEFLON" AF 1601 and 0.2% of $(C_3F_7CH_2O)_3SiCH_2CH_2(CF_2)_6CH_2CH_2Si(OCH_2C_3F_7)_3$ in "FLUORINERT" FC-75 as described in Example 18. The coating was dried for 2 hours at 250° C. The linear low density polyethylene of Example 26 (Control A), which contained 2.5 wt.% of a silica filler, was extruded through the coated capillary for a period of 2 hours at 220° C. and at a constant shear rate of 704 $s^{-1}$. The shear stress required to extrude the polyethylene was 0.32 MPa at the start of the extrusion. The shear stress remained constant for the first 3 mins. and slowly decreased to 0.30 MPa. After 10 min. the shear stress slowly increased to 0.36 MPa after 20 min. The fluoronanocomposite coating performed as a processing aid for the extrusion of low density polyethylene and showed improved abrasion resistance. The improved performance by the fluoropolymer nanocomposite demonstrates that it can be useful in durable coatings in, for example, molds, ducts, and in cookware items such as fry pans.

EXAMPLE 28

Control C: Extrusion of abrasive polyethylene through stainless steel capillary die coated with TFE/HFP copolymer The stainless steel capillary die of Control A in Example 26 was cleaned by heating to red heat with a propane torch. After cooling to room temperature, the inside surface of the capillary was coated with a 3% dispersion of 85/15 wt ratio (TFE/HFP) copolymer in "FLUTEC" PP-11 solvent. The coating was dried for 2 hours at 300° C. The linear low density polyethylene of Control A, which contained 2.5 wt % of a silica filler, was extruded through the coated capillary for a period of two hours at 220° C. and at a constant shear rate of 704 $s^{-1}$. The shear stress required to extrude the polyethylene was 0.25 MPa at the start of the extrusion. The shear stress remained constant for a period of about 10 minutes and then increased to 0.50 MPa after a total of about 40 minutes. The shear stress then remained constant at 0.50 MPa for the duration of the extrusion. The surface of the extrudate was smooth at the start of the extrusion but became rough after about 40 minutes.

This example shows that a coating of a TFE/HFP copolymer on an extrusion die acts as a processing aid for the extrusion of linear low density polyethylene.

Example

Extrusion of abrasive polyethylene through stainless steel capillary die coated with "TEFLON" AF/FBS-Star16 primer top coat of TFE/HFP copolymer The stainless steel capillary die of Control C was cleaned by heating to red heat with a propane torch. After cooling to room temperature, the inside surface of the capillary was coated with a solution of 1% "TEFLON" AF and 0.2% silane coupling agent, $(C_3F_7CH_2O)_3SiCH_2CH_2(CF_2)_6CH_2CH_2Si(OCH_2C_3F_7)_3$ dissolved in "FLUORINERT" FC-75. The coating was dried for 2 hours at 250° C. This primer coating was then top coated with a 3% dispersion of a 85/15 wt ratio TFE/HFP copolymer (e.g., "TEFLON" FEP T9050) in "FLUTEC" PP-11 solvent. The top coat was dried for 2 hours at 30° C. The linear low density polyethylene of Control A, which contained 2.5 wt % of a silica filler, was extruded through the coated capillary for a period of two hours at 220° C. and at a constant shear rate of 704 $s^{-1}$. The shear stress required to extrude the polyethylene was 0.20 MPa at the start of the extrusion. The shear stress remained constant for a period of about 20 minutes and then slowly increased to 0.30 MPa after a total of two hours. The surface of the extrudate was smooth throughout the test.

This example shows that the coating of a primer, consisting of a solution of "TEFLON" AF and a silane, followed by a top coat of a TFE/HFP copolymer onto an extrusion die improves the performance and the durability of the top coat as a processing aid. The improved performance by the primer and topcoat demonstrates that they can be useful in durable coatings in, for example, molds, ducts and in cookware items such as fry pans.

EXAMPLE 29

Transmission Electron Microscopy (TEM) Analysis

FBS (0.019 g) and TFA (0.008 9) were dissolved in 19.00 g of a 0.5% solution of Teflon AF 1601 in FC-75. Carbon grids for TEM analysis were dipcoated three times from this solution. After each dip coat, the grids were heated to 150° C. for 30 min. High resolution TEM analysis of the samples showed particles which were 10–12 nm in diameter. Elemental analysis of these particles comfirmed the presence of Si, C, F, and O.

EXAMPLE 30

Improved Performance of Metal Topcoat Layers on a Fluoronanocomposite Interlayer Dielectric Coating Using FBS and a Copolymer of TFE and PDD A fluoropolymer stock solution consisting of 6% of a TFE/PDD copolymer in FC-75 was prepared. To 63.22 g of this stock solution was added FBS (3.79 g) and TFA (1.57 g). Three other solutions consisting of 59.71 g of the stock solution, 1.80 g FBS, 0.745 g TFA; 65.61 g of stock solution, 0.811 g FBS, 0.337 g TFA; and 58.08 g of the stock solution, 0.358 g FBS and 0.149 g TFA were also prepared giving 6% fluoropolymer solutions containing 6%, 3%, 1.2% and 0.6% FBS silane respectively. Aluminum plates (2"×4") were dip coated from each of the four solution and baked at 150° C. for 30 min. followed by 225° C. for 30 min. An aluminum plate dip coated from the 6% stock solution was prepared similarly as a control sample. Each plate was cut into smaller 1.25"×2" samples, and half of these samples were sputtered with a topcoat of gold. Both the gold-coated and uncoated samples were heated to 400° C. and cooled to room temperature. The gold coating of the fluoropolymer control sample showed visible cracking after thermal cycling, while all the gold coatings of the fluoropolymer nanocomposite samples were intact, shiny and showed no cracking of the coating. The samples from the 6% FBS and 0.6% FBS solutions were crosshatched subjected to a adhesive tape pull. The gold coatings were unaffected by a tape pull.

This example shows that, after thermal cycling, the fluoropolymer nanocomposite layer has improved dimensional stability and good bonding to the metal topcoat. The improved performance of this coating demonstrates that it can be useful as an interlayer dielectric material.

EXAMPLE 31

Low surface energy coating on zirconia using HFBS/FBS-PDD and a copolymer of TFE and PDD A solution was prepared similar to that in Example 24 using 30.00 g of a 0.5 wt % solution containing a copolymer of TFE and PDD in FC-75, 32 mg of a 1:1 molar mixture of HFBS and FBS-PDD and 8 mg of TFA. The solution was allowed to stand for 1 hr. Slabs of zirconia (25.7 mm×26.4 mm×1.7 mm) were dipcoated using this as described previously. The slabs were air dried for 1.5 hr, and analyzed by contact angle measurements. The hexadecane advancing contact angle for the coated zirconia was 64° while that of the uncoated zirconia was 13°.

EXAMPLE 32

Low surface energy coating on zirconia using FBS and a copolymer of TFE and PDD

A solution was prepared similar to that in Example 17 using 30.02 g of a 0.5 wt % solution containing a copolymer of TFE and PDD in FC-75, 35 mg of a FBS and 18 mg of TFA. The solution was allowed to stand for 1 hr. Slabs of zirconia(25.7 mm×26.4 mm×1.7 mm) were dipcoated using this as described previously. The slabs were air dried for 1.5 hr, and analyzed by contact angle measurements. The hexadecane advancing contact angle for the coated zirconia was 51° while that of the uncoated zirconia was 13°.

EXAMPLE 33

Low surface energy coating on "NOMEX"aramid paper using HFBS/FBS-PDD and a copolymer of TFE and PDD "NOMEX" aramid paper (57 mm×25 mm) was dipcoated using the solution described in Example 31. The paper was air dried for 1.5 hr, and analyzed by contact angle measurements. The hexadecane advancing contact angle for the coated paper was 64° while that of the uncoated paper was 9°.

EXAMPLE 34

Low surface energy coating on "NOMEX" aramid paper using FBS and a copolymer Of TFE and PDD "NOMEX" aramid paper (57 mm×25 mm) was dipcoated using the solution described in Example 32. The paper was air dried for 1.5 hr, and analyzed by contact angle measurements. The hexadecane advancing contact angle for the coated paper was 56° while that of the uncoated paper was 9°.

EXAMPLE 35

Low surface energy coating on "KALREZ" elastomer using HFBS/FBS-PDD and a copolymer of TFE and PDD "KALREZ" elastomer (76 mm×17 mm×9 mm) was dipcoated using the solution described in Example 31. The sample was air dried for 1.5 hr, and analyzed by contact angle measurements. The hexadecane advancing contact angle for the coated "KALREZ" was 71° while that of the uncoated "KALREZ" was 47°.

EXAMPLE 36

Low surface energy coating on "KALREZ" elastomer using FBS and a copolymer of TFE and PDD "KALREZ" elastomer (76 mm×17 mm×9 mm) was dipcoated using the solution described in Example 32. The sample was air dried for 1.5 hr, and analyzed by contact angle measurements. The hexadecane advancing contact angle for the coated "KALREZ" was 62° while that of the uncoated "KALREZ" was 47°.

EXAMPLE 37

Low surface energy coating on crystalline Nylon 6, 6 using HFBS/FBS-PDD and a copolymer of TEE and PDD A bar of Nylon 6.6 (125 mm×13 mm×3 mm) was dipcoated using the solution described in Example 31. The sample was air dried for 1.5 hr, and analyzed by contact angle measurements. The hexadecane advancing contact angle for the coated Nylon was 60° while that of the uncoated Nylon was 6°.

EXAMPLE 38

Low surface energy coating on crystalline Nylon 6, 6 using FBS and a copolymer of TFE and PDD A bar of Nylon 6.6 (125 mm×13 mm×3 mm) was dipcoated using the solution described in Example 32. The sample was air dried for 1.5 hr, and analyzed by contact angle measurements. The hexadecane advancing contact angle for the coated Nylon was 65° while that of the uncoated Nylon was 6°.

EXAMPLE 39

Low surface energy coating on copper using HFBS/FBS-PDD and a copolymer of TFE and PDD A slab of copper (3"×1"×⅛") was cleaned using kitchen cleanser, rinsed well with distilled water then acetone and dried overnight at 110° C. The copper was then dipcoated using the solution described in Example 31. The coated metal was dried at 150° C. for 30 min in air, and analyzed by contact angle measurements. The hexadecane advancing contact angle for the coated copper was 64° while that of the uncoated copper was 5°.

EXAMPLE 40

Low surface energy coating on copper using FBS and a copolymer of TFE and PDD

The slab of copper (3"×1"×⅛") cleaned as described in the previous example was dipcoated using the solution described in Example 32. The coated metal was dried at 150° C. for 30 min in air, and analyzed by contact angle measurements. The hexadecane advancing contact angle for the coated copper was 55° while that of the uncoated copper was 5°.

EXAMPLE 41

Low surface energy coating on brass using HFBS/FBS-PDD and a copolymer of TFE and PDD A slab of brass (3"×1"×⅛") was cleaned as described in Example 39. The brass was next dipcoated using the solution described in Example 31. The coated metal was dried at 150° C. for 30 min in air, and analyzed by contact angle measurements. The hexadecane advancing contact angle for the coated brass was 58° while that of the uncoated brass was 6°.

EXAMPLE 42

Low surface energy coating on brass using FBS and a copolymer of TFE and PDD

A slab of brass (3"×1"×⅛") was cleaned as described previously. The brass was next dipcoated using the solution described in Example 32. The coated metal was dried at 150° C. for 30 min in air, and analyzed by contact angle measurements. The hexadecane advancing contact angle for the coated brass was 46° while that of the uncoated brass was 6°.

EXAMPLE 43

Corrosion resistant coatings using HFBS/FBS-PDD and a copolymer of TFE and PDD on copper and brass Samples of copper and brass prepared as described in Examples 39 and 41 were soaked in a solution consisting of 3.5 wt. % NaCl dissolved in distilled water for 18 hr at room temperature. Upon removing samples from the solution, the uncoated areas were discolored and corroded while the coated area was not discolored and resembled the original metal prior to dip coating.

EXAMPLE 44

Low surface energy coating on silicone rubber using HFBS/FBS-PDD and a copolymer of TFE and PDD A slab of silicone rubber (22.5 mm×77 mm×3 mm) was dipcoated using the solution described in Example 31. The sample was air dried for 1.5 hr, and analyzed by contact angle measurements. The hexadecane advancing contact angle for the coated silicone was 74° while that of the uncoated silicone was 20°.

EXAMPLE 45

Low surface energy coating on silicone rubber using FBS and a copolymer of TFE and PDD A slab of silicone rubber (22.5 mm×77 mm×3 mm) was dipcoated using the solution described in Example 32. The sample was air dried for 1.5 hr, and analyzed by contact angle measurements. The hexadecane advancing contact angle for the coated silicone was 60° while that of the uncoated silicone was 25°.

EXAMPLE 46

Low surface energy coating on PMMA using HFBS/FBS-PDD and a copolymer of TFE and PDD A slab of PMMA (22.5 mm×77 mm×3 mm) was dipcoated using the solution described in Example 31. The sample was air dried for 1.5 hr, and analyzed by contact angle measurements. The hexadecane advancing contact angle for the coated PMMA was 59° while that of the uncoated PMMA was 4°.

EXAMPLE 47

Low surface energy coating of PMMA using FBS and a copolymer Of TFE and PDD

A slab of PMMA (22.5 mm×77 mm×3 mm) was dipcoated using the solution described in Example 32. The sample was air dried for 1.5 hr, and analyzed by contact angle measurements. The hexadecane advancing contact angle for the coated PMMA was 48° while that of the uncoated PMMA was 11°.

EXAMPLE 48

Low surface energy coating on "KAPTON" polyimide film using HFBS/FBS-PDD and a copolymer of TFE and PDD A piece of "KAPTON" polyimide film (22.5 mm×77 mm×0.075 mm) was dipcoated using the solution described in Example 31. The sample was air dried for 1.5 hr, and analyzed by contact angle measurements. The hexadecane advancing contact angle for the contact angle for the coated "KAPTON" was 63° while that of the uncoated "KAPTON" was 4°.

EXAMPLE 49

Low surface energy coating on "KAPTON" polyimide film using FBS and a copolymer of TFE and PDD A piece of "KAPTON" polyimide film (22.5 mm×77 mm×0.075 mm) was dipcoated using the solution described in Example 32. The sample was air dried for 1.5 hr, and analyzed by contact angle measurements. The hexadecane advancing contact angle for the coated "KAPTON" was 53° while that of the uncoated "KAPTON" was 6°.

EXAMPLE 50

Low surface energy coating on "MYLAR" polyester film using HFBS/FBS-PDD and a copolymer of TFE and PDD A piece of oxygen plasma-treated "MYLAR" polyester film (22.5 mm×77 mm×0.023 mm) was dipcoated using the solution described in Example 31. The sample was air dried for 1.5 hr, and analyzed by contact angle measurements. The hexadecane advancing contact angle for the coated "MYLAR" was 62° while that of the uncoated "MYLAR" was 8°.

EXAMPLE 51

Low surface energy coating on "MYLAR" polyester film using FBS and a copolymer of TFE and PDD A piece of oxygen plasma-treated "MYLAR" polyester film (22.5 mm×77 mm×0.023 mm) was dipcoated using the solution described in Example 32. The sample was air dried for 1.5 hr, and analyzed by contact angle measurements. The hexadecane advancing contact angle for the coated "MYLAR" was 62° while that of the uncoated "MYLAR" was 5°.

EXAMPLE 52

Low surface energy coating on glass using PFPS and a copolymer of TFE and HFP

To a stock solution consisting of 1% of a copolymer of TFE and HFP in FC-75 was added PFPS and TFA (molar ratio 1:6) until the final concentration of PFPS was 0.5 wt. %. Glass slides (1"×3") were cleaned and dipcoated using this solution as described previously. The slides were dried at 100° C. for 30 min., and analyzed by contact angle measurements. The hexadecane advancing contact angle for the coated glass was 68°.

EXAMPLE 53

Low surface energy coating on silicone rubber using PFPS and a Copolymer of TFE and HFP A slab of silicone rubber (1–×3") was cleaned using $CH_2Cl_2$, dried and dipcoated using the solution in Example 52. The slab was dried at 100° C. for 30 min., and analyzed by contact angle measurements. The hexadecane advancing contact angle for the coated silicone rubber was 65°.

EXAMPLE 54

Low surface energy coating on flame-treated silicone rubber using PFPS and a copolymer Of TFE and HFP A slab of silicone rubber (1–×3") was cleaned using $CH_2Cl_2$, and passed through a gas flame in order to lightly oxidize and modify the surface. The rubber was immediately dipcoated using the solution in Example 52. The sample was dried at 100° C. for 30 min., and analyzed by contact angle measurements. The hexadecane advancing contact angle for the coated silicone rubber was 69°.

EXAMPLE 55

Low surface energy coating on "VITON" elastomer using PFPS and a copolymer of TFE and HFP A slab of "VITON" GF elastomer (1–×3") was cleaned using $CH_2Cl_2$, dried and dipcoated using the solution in Example 52. The slab was dried at 100° C. for 30 min., and analyzed by contact angle measurements. The hexadecane advancing contact angle for the coated "VITON" was 67°.

EXAMPLE 56

Low surface energy coating on nitrile rubber using PFPS and a copolymer of TEE and HFP A slab of nitrile rubber (1–×3") was cleaned using $CH_2Cl_2$, dried and dipcoated using the solution in Example 52. The slab was dried at 100° C. for 30 min., and analyzed by contact angle measurements. The hexadecane advancing contact angle for the coated nitrile rubber was 64°.

EXAMPLE 57

Low surface energy coating on EPDM rubber using PFPS and a copolymer Of TFE and HFP Slabs of generic EPDM rubber and "NORDEL" 1320 (1–×3") were cleaned using $CH_2Cl_2$, dried and dipcoated using the solution in Example 52. The slabs were dried at 100° C. for 30 min., and analyzed by contact angle measurements. The hexadecane advancing contact angle for the coated rubbers were 65° and 69°, respectively.

EXAMPLE 58

Low surface energy coating On "VAMAC" using PEPS and a copolymer of TFE and HFP

A slab of "VAMAC" (1–×3") was cleaned using $CH_2Cl_2$, dried and dipcoated using the solution in Example 52. The slab was dried at 100° C. for 30 min., and analyzed by contact angle measurements. The hexadecane advancing contact angle for the coated "VAMAC" was 60°.

EXAMPLE 59

Low Surface energy Coating on "CHEMRAZ" elastomer using PFPS and a copolymer of TFE and HFP A slab of "CHEMRAZ" elastomer (1–×3") was cleaned using $CH_2Cl_2$, dried and dipcoated using the solution in Example 52. The slab was dried at 100° C. for 30 min., and analyzed by contact angle measurements. The hexadecane advancing contact angle for the coated glass was 67°. The coating passed a tape pull.

What is claimed is:

1. A fluoropolymer nanocomposite, comprising:
   (a) a fluoropolymer phase comprising at least one fluoropolymer; and
   (b) at least one partially or fully cross-linked inorganic oxide phase prepared from at least one inorganic oxide precursor, said inorganic oxide phase being dispersed within said fluoropolymer phase and said inorganic oxide phase either exhibiting no particles or substantially all particles present in the inorganic oxide phase having a particle size of less than about 75 nm; and the fluoropolymer and the inorganic oxide precursor being soluble in a fluorinated solvent.

2. The fluoropolymer nanocomposite of claim 1 wherein the inorganic oxide phase is continuous.

3. The fluoropolymer nanocomposite of claim 2 wherein the inorganic oxide phase and the fluoropolymer phase form a semi-interpenetrating network.

4. The fluoropolymer nanocomposite of claim 1 wherein the inorganic oxide phase is discontinuous.

5. The fluoropolymer nanocomposite of claim 4 wherein the particle size of substantially all particles of the inorganic oxide phase is from about 0.1 nm to about 50 nm.

6. The fluoropolymer nanocomposite of claim 1 wherein the at least one inorganic oxide precursor comprises a mixture of inorganic oxide precursors, each precursor being individually soluble or insoluble in the fluorinated solvent, provided said mixture is soluble in the fluorinated solvent.

7. The fluoropolymer nanocomposite of claim 1 wherein the inorganic oxide precursor is an alkoxide or fluoroalkoxide of Al, B, Ge, Si, Sn, Ti and Zr.

8. The fluoropolymer nanocomposite of claim 7 wherein the inorganic oxide precursor is a compound having the formula $(R_fC_aH_{2a}O)_nMR^{4-n}$, wherein:

M is Ge, Si or Sn;

a is 1 to 10;

n is 2, 3 or 4;

$R_f$ has up to about of 18 carbon atoms and is selected from the group consisting of:
   (a) $C_1$ to about $C_{18}$ perfluoroalkyl;
   (b) $-[CF_2CF(CF_3)O]_r-CF_2-CF_2-CF_3$, wherein r is an integer of at least 1;
   (c) $-CF_2-(CF_2-O)_q-CF_3$, wherein q is an integer of at least 2; and (d) —CH₂—C(CF₃)₂—CF₂—CF₂—CF₃; and R is selected from the group consisting of:

H, C₁ to about C₈ alkyl, C$_a$H$_{2a}$R$_f$, C₁ to about C₈ alkoxy, C₁ to about C₈ alkenyl, C₁ to about C₈ alkynyl, C₆H₅, aryl, and aralkyl.

9. The fluoropolymer nanocomposite of claim 7 wherein the inorganic oxide precursor is a compound having the formula (R$_f$C$_a$H$_{2a}$O)$_n$M¹R$_{4-n}$(HOR)$_q$¹, wherein M¹ is Ti or Zr;

n is 2, 3, or 4;

R$_f$ has up to about of 18 carbon atoms and is selected from the group consisting of:
(a) C₁ to about C₁₈ perfluoroalkyl;
(b) —[CF₂CF(CF₃)O]$_r$—CF₂—CF₂—CF₃, wherein r is an integer of at least 1;
(c) —CF₂—(CF₂—O)$_q$—CF₃, wherein q is an integer of at least 2; and
(d) —CH₂—C(CF₃)₂—CF₂—CF₂—CF₃;

R is selected from the group consisting of:
H, C₁ to about C₈ alkyl, C$_a$H$_{2a}$R$_f$, C₁ to about C₈ alkoxy, C₁ to about C₈ alkenyl, C₁ to about C₈ alkynyl, C₆H₅, aryl, and aralkyl;

a is an integer from 1 to about 10; and q¹ is 0 or 1.

10. The fluoropolymer nanocomposite of claim 7 wherein the inorganic oxide precursor is a compound having the formula (R$_f$C$_a$H$_{2a}$O)$_n$·M'R$_{3-n'}$, wherein:

M' is Al or B;

n' is 1, 2 or 3;

R$_f$ has up to about of 18 carbon atoms and is selected from the group consisting of:
(a) C₁ to about C₁₈ perfluoroalkyl;
(b) —[CF₂CF(CF₃)O]$_r$—CF₂—CF₂—CF₃, wherein r is an integer of at least 1;
(c) —CF₂—(CF₂—O)$_q$—CF₃, wherein q is an integer of at least 2; and
(d) —CH₂—C(CF₃)₂—CF₂—CF₂—CF₃;

R is selected from the group consisting of:
H, C₁ to about C₈ alkyl, C$_a$H$_{2a}$R$_f$, C₁ to about C₈ alkoxy, C₁ to about C₈ alkenyl, C₁ to about C₈ alkynyl, C₆H₅, aryl, and aralkyl;

a is an integer from 1 to about 10.

11. The fluoropolymer nanocomposite of claim 7 wherein the inorganic oxide precursor is a chelating compound having the formula (R$_f$C$_a$H$_{2a}$O)$_{n''}$M''$^{cn}$D$^d$p, wherein:

D is a chelating ligand, optionally fluorinated;

M" is Si, Al, Ti or Zr;

cn is a silicon, aluminum, titanium or zirconium coordination number, being in each case an integer having a value of 4–6;

d is a number, either 2 or 3, corresponding to the chelating ability of the ligand D, d being 2 for a bidentate ligand and 3 for a tridentate ligand;

p is either 1, 2 or 3, except that for d=3, p always is 1;

n" is cn−(d×p);

R$_f$ has up to about of 18 carbon atoms and is selected from the group consisting of:
(a) C₁ to about C₁₈ perfluoroalkyl;
(b) —[CF₂CF(CF₃)O]$_r$—CF₂—CF₂—CF₃, wherein r is an integer of at least 1;
(c) —CF₂—(CF₂—O)$_q$—CF₃, wherein q is an integer of at least 2; and
(d) —CH₂—C(CF₃)₂—CF₂—CF₂—CF₃; and a is an integer from 1 to about 10.

12. The fluoropolymer nanocomposite of claim 1 wherein the inorganic oxide precursor is a fluorine-bearing silane.

13. The fluoropolymer nanocomposite of claim 12 wherein the inorganic oxide precursor is a compound selected from the group consisting of:

a compound having the formula:

(R$_f$C$_a$H$_{2a}$O)$_t$SiR$_{4-t}$     (I)

wherein:

R$_f$ has up to about 18 carbon atoms and is selected from the group consisting of:
(a) C₁ to about C₁₈ perfluoroalkyl;
(b) —[CF₂CF(CF₃)O]$_r$—CF₂—CF₂—CF₃, wherein r is an integer of at least 1;
(c) —CF₂—(CF₂—O)$_q$—CF₃, wherein q is an integer of at least 2; and
(d) —CH₂—C(CF₃)₂—CF₂—CF₂—CF₃;

each R$_f$ optionally substituted with one or more hydrogen;

R is selected from the group consisting of:
hydrogen, C₁ to about C₈ alkyl, C$_a$H$_{2a}$R$_f$, C₁ to about C₈ alkoxy, C₁ to about C₁₀ carboxy, C₁ to about C₁₀ fluorocarboxy, C₂ to about C₈ alkenyl, C₂ to about C₈ alkynyl, C₆H₅, aryl, and aralkyl;

t is 1, 2, 3 or 4; and a is an integer from 1 to about 10;

a compound having the formula:

X(Si(OC$_a$H$_{2a}$R$_f$)₃)$_n$     (II)

wherein:

X is at least one organic link selected from the group consisting of:
(a) R¹$_m$SiY$_{4-m}$;
(b) ring structures

IIb(i)

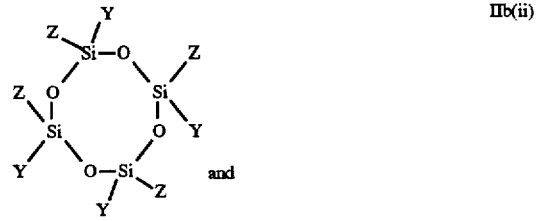
IIb(ii)

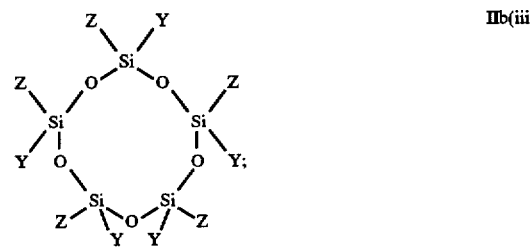
IIb(iii)

(c) R¹$_m$Si(OSi(CH₃)₂Y)$_{4-m}$;
(d) CH₃SiY₂OSiY₂CH₃;
(e) Y₃SiOSiY₃;
(f) Y₂(CH₃)Si(CH₂)$_b$Si(CH₃)Y₂;
(g) Y₃Si(CH₂)$_b$SiY₃;

(h) $Y_3SiC_6H_4SiY_3$;
(i) substituted benzene, including all isomers, selected from the group consisting of:
  (i) $C_6H_3(SiZ_{3-c}Y_c)_3$;
  (ii) $C_6H_2(SiZ_{3-c}Y_c)_4$;
  (iii) $C_6H(SiZ_{3-c}Y_c)_5$; and
  (iv) $C_6(SiZ_{3-c}Y_c)_6$; and
(j) substituted cyclohexane, including all stereoisomers, selected from the group consisting of:
  (i) 1,2-$C_6H_{10}(Y)_2$; 1,3-$C_6H_{10}(Y)_2$; 1,4-$C_6H_{10}(Y)_2$;
  (ii) 1,2,4-$C_6H_9(Y)_3$; 1,2,3-$C_6H_9(Y)_3$; 1,3,5-$C_6H_9(Y)_3$;
  (iii) 1,2,3,4-$C_6H_8(Y)_4$; 1,2,4,5-$C_6H_8(Y)_4$; 1,2,3,5-$C_6H_9(Y)_4$;
  (iv) 1,2,3,4,5-$C_6H_7(Y)_5$; and
  (v) $C_6H_6(Y)_6$;

$R_f$ has up to about 18 carbon atoms and is selected from the group consisting of:
(a) $C_1$ to about $C_{18}$ perfluoroalkyl;
(b) —[$CF_2CF(CF_3)O$]$_r$—$CF_2$—$CF_2$—$CF_3$, wherein r is an integer of at least 1;
(c) —$CF_2$—($CF_2$—O)$_q$—$CF_3$, wherein q is an integer of at least 2; and
(d) —$CH_2$—$C(CF_3)_2$—$CF_2$—$CF_2$—$CF_3$;

each $R_f$ optionally substituted with one or more hydrogen;
Z is $C_1$ to about $C_4$ alkyl, 3,3,3-trifluoropropyl, aralkyl or aryl;
Y is —$(CR^2R^3)_k CR^4R^5CR^6R^7(CR^8R^9)_h$—
$R^1$ is $C_1$ to about $C_8$ alkyl or aryl;
$R^2$ to $R^9$ are each independently hydrogen, $C_1$ to about $C_8$ alkyl or aryl, provided that at least one of $R^4$ to $R^7$ is hydrogen;
m is 0, 1 or 2;
k and h are each independently an integer from 0 to 10, provided that at least one of k or h is zero;
a is an integer from 1 to about 10;
b is an integer from 1 to about 10;
c is 1, 2 or 3; and
n is an integer greater than or equal to 2;

IIA: a compound having the formula:

$$X(R^{10}Si(OC_aH_{2a}R_f)_2)_n \quad \text{(IIA)}$$

wherein:

X is at least one organic link selected from the group consisting of:
(a) $R^1_m SiY_{4-m}$;
(b) ring structures

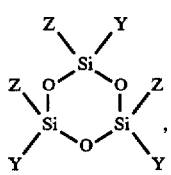
(IIAb(i))

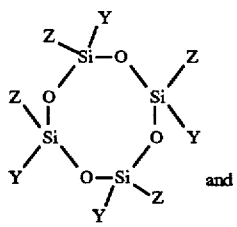
(IIAb(ii))

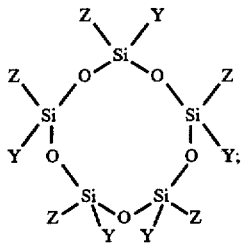
(IIAb(iii))

(c) $R^1_m Si(OSi(CH_3)_2Y)_{4-m}$;
(d) $CH_3SiY_2OSiY_2CH_3$;
(e) $Y_3SiOSiY_3$;
(f) $Y_2(CH_3)Si(CH_2)_b Si(CH_3)Y_2$;
(g) $Y_3Si(CH_2)_b SiY_3$;
(h) $Y_3SiC_6H_4SiY_3$;
(i) substituted benzene, including all isomers, selected from the group consisting of:
  (i) $C_6H_3(SiZ_{3-c}Y_c)_3$;
  (ii) $C_6H_2(SiZ_{3-c}Y_c)_4$;
  (iii) $C_6H(SiZ_{3-c}Y_c)_5$; and
  (iv) $C_6(SiZ_{3-c}Y_c)_6$; and
(j) substituted cyclohexane, including all stereoisomers, selected from the group consisting of:
  (i) 1,2-$C_6H_{10}(Y)_2$; 1,3-$C_6H_{10}(Y)_2$; 1,4-$C_6H_{10}(Y)_2$;
  (ii) 1,2,4-$C_6H_9(Y)_3$; 1,2,3-$C_6H_9(Y)_3$; 1,3,5-$C_6H_9(Y)_3$;
  (iii) 1,2,3,4-$C_6H_8(Y)_4$; 1,2,4,5-$C_6H_8(Y)_4$; 1,2,3,5-$C_6H_9(Y)_4$;
  (iv) 1,2,3,4,5-$C_6H_7(Y)_5$; and
  (v) $C_6H_6(Y)_6$;

$R_f$ has up to about 18 carbon atoms and is selected from the group consisting of:
(a) $C_1$ to about $C_{18}$ perfluoroalkyl;
(b) —[$CF_2CF(CF_3)O$]$_r$—$CF_2$—$CF_2$—$CF_3$, wherein r is an integer of at least 1;
(c) —$CF_2$—($CF_2$—O)$_q$—$CF_3$, wherein q is an integer of at least 2; and
(d) —$CH_2$—$C(CF_3)_2$—$CF_2$—$CF_2$—$CF_3$;

each $R_f$ optionally substituted with one or more hydrogen;
Z is $C_1$ to about $C_4$ alkyl, 3,3,3-trifluoropropyl, aralkyl or aryl;
Y is —$(CR^2R^3)_k CR^4R^5CR^6R^7(CR^8R^9)_h$—
$R^1$ is $C_1$ to about $C_8$ alkyl or aryl;
$R^2$ to $R^9$ are each independently hydrogen, $C_1$ to about $C_8$ alkyl, or aryl, provided that at least one of $R^4$ to $R^7$ is hydrogen;
$R^{10}$ is $C_1$ to about $C_8$ alkyl or $C_aH_{2a}R_f$;
m is 0, 1 or 2;
k and h are each independently an integer from 0 to 10, provided that at least one of k or h is zero;
a is an integer from 1 to about 10;
b is an integer from 1 to about 10;
c is 1, 2 or 3; and
n is an integer greater than or equal to 2;

a compound having the formula:

$$(CF_2)_x[YSi(OR^{13})_3]_2 \quad \text{(III)}$$

wherein:
$R^{13}$ is $C_1$ to about $C_8$ alkyl, $C_1$ to about $C_{10}$ carboxy, $C_1$ to about $C_{10}$ fluorocarboxy, halogen or $C_aH_{2a}R_f$;

47

$R_f$ has up to about 18 carbon atoms and is selected from the group consisting of:
(a) $C_1$ to about $C_{18}$ perfluoroalkyl;
(b) —[$CF_2CF(CF_3)O$]$_r$—$CF_2$—$CF_2$—$CF_3$, wherein r is an integer of at least 1;
(c) —$CF_2$—($CF_2$—O)$_q$—$CF_3$, wherein q is an integer of at least 2; and
(d) —$CH_2$—$C(CF_3)_2$—$CF_2$—$CF_2$—$CF_3$;

each $R_f$ optionally substituted with one or more hydrogen;
a is an integer from 1 to about 10;
v is an even integer from 2 to about 14;
Y is —($CR^2R^3$)$_k$$CR^4R^5CR^6R^7$($CR^8R^9$)$_h$—

$R^2$ to $R^9$ are each independently hydrogen, $C_1$ to about $C_8$ alkyl or aryl, provided that at least one of $R^4$ to $R^7$ is hydrogen; and k and h are each independently an integer from 0 to 10, provided that at least one of k or h is zero;

IIIA: a compound having the formula:

$$(CF_2)_v(YSiR^{10}(OR^{10})_2)_2 \quad \text{(IIIA)}$$

wherein:
$R^{10}$ is $C_1$ to about $C_8$ alkyl or $C_aH_{2a}R_f$;
$R_f$ has up to about 18 carbon atoms and is selected from the group consisting of:
(a) $C_1$ to about $C_{18}$ perfluoroalkyl;
(b) —[$CF_2CF(CF_3)O$]$_r$—$CF_2$—$CF_2$—$CF_3$, wherein r is an integer of at least 1;
(c) —$CF_2$—($CF_2$—O)$_q$—$CF_3$, wherein q is an integer of at least 2; and
(d) —$CH_2$—$C(CF_3)_2$—$CF_2$—$CF_2$—$CF_3$;

each $R_f$ optionally substituted with one or more hydrogen;
a is an integer from 1 to about 10;
v is an even integer from 2 to about 14; and
Y is —($CR^2R^3$)$_k$$CR^4R^5CR^6R^7$($CR^8R^9$)$_h$—

$R^{13}$ is $C_1$ to about $C_8$ alkyl, $C_1$ to about $C_{10}$ carboxy, $C_1$ to about $C_{10}$ fluorocarboxy, halogen or $C_aH_{2a}R_f$;

$R^1$ is $C_1$ to about $C_8$ alkyl or aryl;

$R^2$ to $R^9$ are each independently hydrogen, $C_1$ to about $C_8$ alkyl, or aryl, provided that at least one of $R^4$ to $R^7$ is hydrogen; and k and h are each independently an integer from 0 to 10, provided that at least one of k or h is zero;

a fluoroalkylphenylsilane having the formula:

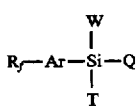

(IV)

wherein:
$R_f$ has up to about 18 carbon atoms and is selected from the group consisting of:
(a) $C_1$ to about $C_{18}$ perfluoroalkyl;
(b) —[$CF_2CF(CF_3)O$]$_r$—$CF_2$—$CF_2$—$CF_3$, wherein r is an integer of at least 1;
(c) —$CF_2$—($CF_2$—O)$_q$—$CF_3$, wherein q is an integer of at least 2; and
(d) —$CH_2$—$C(CF_3)_2$—$CF_2$—$CF_2$—$CF_3$;

each $R_f$ optionally substituted with one or more hydrogen;
Ar is a divalent aromatic radical;
W is selected from the group consisting of
(e) $C_1$ to about $C_8$ alkyl;
(f) $R_f$—Ar, wherein each of $R_f$ and Ar is as defined above;

48

(g) halogen selected from the group consisting of chlorine, bromine and iodine;
(h) $C_1$ to about $C_8$ alkoxy;
(i) $C_1$ to about $C_8$ fluoroalkoxy; and
(j) $C_1$ to about $C_{10}$ carboxy or fluorocarboxy; and each of Q and T independently is selected from the group consisting of
(k) halogen selected from the group consisting of chlorine, bromine and iodine;
(l) $C_1$ to about $C_8$ alkoxy;
(m) $C_1$ to about $C_8$ fluoroalkoxy; and
(n) $C_1$ to about $C_{10}$ carboxy or fluorcarboxy;

a dioxolane having the formula:

(V)

wherein:
$R^{13}$ is $C_1$ to about $C_8$ alkyl, $C_1$ to about $C_8$ carboxy, $C_1$ to about $C_8$ fluorocarboxy, halogen or $C_aH_{2a}R_f$;
$R_f$ has up to about 18 carbon atoms and is selected from the group consisting of:
(a) $C_1$ to about $C_{18}$ perfluoroalkyl;
(b) —[$CF_2CF(CF_3)O$]$_r$—$CF_2$—$CF_2$—$CF_3$, wherein r is an integer of at least 1;
(c) —$CF_2$—($CF_2$—O) q—$CF_3$, wherein q is an integer of at least 2; and
(d) —$CH_2$—$C(CF_3)_2$—$CF_2$—$CF_2$—$CF_3$;

each $R_f$ optionally substituted with one or more hydrogen;
$R^{11}$ and $R^{12}$ are each independently selected from $C_1$ to $C_3$ fluoroalkyl or fluorine;
a is an integer from 1 to about 10; and
Y is —($CR^2R^3$)$_k$$CR^4R^5CR^6R^7$($CR^8R^9$)$_h$—

$R^2$ to $R^9$ are each independently hydrogen, $C_1$ to about $C_8$ alkyl, or aryl, provided that at least one of $R^4$ to $R^7$ is hydrogen; and k and h are each independently an integer from 0 to 10, provided that at least one of k or h is zero;

VA: a dioxolane having the formula:

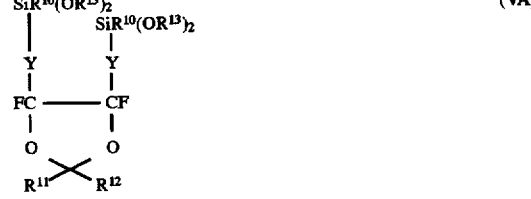

(VA)

wherein:
$R^{10}$ is $C_1$ to about $C_8$ alkyl or $C_aH_{2a}R_f$;
$R_f$ has up to about 18 carbon atoms and is selected from the group consisting of:
(a) $C_1$ to about $C_{18}$ perfluoroalkyl;
(b) —[$CF_2CF(CF_3)O$]$_r$—$CF_2$—$CF_2$—$CF_3$, wherein r is an integer of at least 1;
(c) —$CF_2$—($CF_2$—O)$_q$—$CF_3$, wherein q is an integer of at least 2; and
(d) —$CH_2$—$C(CF_3)_2$—$CF_2$—$CF_2$—$CF_3$;

each $R_f$ optionally substituted with one or more H;
$R^{11}$ and $R^{12}$ are each independently selected from $C_1$ to $C_3$ fluoroalkyl or fluorine;

a is an integer from 1 to about 10; and

Y is —(CR²R³)$_k$CR⁴R⁵CR⁶R⁷(CR⁸R⁹)$_h$—

R¹³ is C₁ to about C₈ alkyl, C₁ to about C₁₀ carboxy, C₁ to about C₁₀ fluorocarboxy, halogen or C$_a$H$_{2a}$R$_f$;

R² to R⁹ are each independently hydrogen, C₁ to about C₈ alkyl, or aryl, provided that at least one of R⁴ to R⁷ is hydrogen; and k and h are each independently an integer from 0 to 10, provided that at least one of k or h is zero; and a compound having the formula:

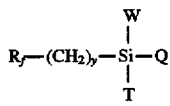
(VI)

wherein:

y is an integer from 2 to about 10;

R$_f$ has up to about 18 carbon atoms and is selected from the group consisting of
  (a) C₁ to about C₁₈ perfluoroalkyl;
  (b) —[CF₂CF(CF₃)O]$_r$—CF₂—CF₂—CF₃, wherein r is an integer of at least 1;
  (c) —CF₂—(CF₂—O)$_q$—CF₃, wherein q is an integer of at least 2; and
  (d) —CH₂—C(CF₃)₂—CF₂—CF₂—CF₃;

each R$_f$ optionally substituted with one or more hydrogen;

Ar is a divalent aromatic radical;

W is selected from the group consisting of
  (e) C₁ to about C₈ alkyl;
  (f) R$_f$—Ar, wherein each of R$_f$ and Ar is as defined above;
  (g) halogen selected from the group consisting of chlorine, bromine and iodine;
  (h) C₁ to about C₈ alkoxy;
  (i) C₁ to about C₈ fluoroalkoxy; and
  (j) C₁ to about C₈ carboxy or fluorocarboxy; and each of Q and T independently is selected from the group consisting of
  (k) halogen selected from the group consisting of chlorine, bromine and iodine;
  (l) C₁ to about C₈ alkoxy;
  (m) C₁ to about C₈ fluoroalkoxy; and
  (n) C₁ to about C₁₀ carboxy or fluorocarboxy.

14. The fluoropolymer nanocomposite of claim 13 wherein the inorganic oxide precursor is selected from the group consisting of: Si(OCH₂CF₃)₄; Si(OCH₂C₃F₇)₄; HSi(OCH₂C₃F₇)₃; F(CF₂)₆CH₂CH₂Si(OCH₂CH₃)₃; F(CF₂)₆CH₂CH₂Si(OCH₂CF₃)₃; F(CF₂)₆CH₂CH₂Si(OCH₃)₃; (CH₃O)₃Si(OCH₂CH₂C₆F₁₃); (CH₃O)₂Si(OCH₂CH₂C₆F₁₃)₂; Si(OCH₂CH₂C₆F₁₃)₄; HSi(OCH₂CF₃)₃; (CH₃O)₃Si(OCH₂CF₃CF₃); (CH₃O)₃Si(OCH₂C₃F₇); (CH₃O)₂Si(OCH₂CF₃)₂; (CH₃O) Si(OCH₂CF₃)₃; (CH₃O)Si(OCH₂C₃F₇)₃; (CH₃O)₂Si(OCH₂C₃F₇)₂; CH₂=CHSi(OCH₂CF₃)₃; CH₂=CHSi(OCH₂C₃F₇)₃; Si(OSi(CH₃)₂CH₂CH₂Si(OCH₂CF₃)₃)₄; Si(OSi(CH₃)₂CH₂CH₂Si(OCH₂C₃F₇)₃)₄; Si(CH₂CH₂Si(OCH₂CF₃)₃)₄; Si(CH₂CH₂Si(OCH₂C₃F₇)₃)₄; (CH₃((CCF₃CH₂O)₃SiCH₂CH₂SiO)₄; (CH₃((C₃F₇CH₂O)₃SiCH₂CH₂)SiO)₄; (C₃F₇CH₂O)₃Si(CH₂)₂(CF₂)₆(CH₂)₂Si(OCH₂C₃F₇)₃; (CF₂)₆[(CH₂)₂Si(OCH₂CF₃)₃]₂; C₈F₁₇C₆H₄(OCH₃)₃; C₈F₁₇C₆H₄(OCH₂CF₃)₃; C₈F₁₇CH₂CH₂Si(OCH₃)₃; C₈F₁₇CH₂CH₂Si(OCH₂C₃F₇)₃;

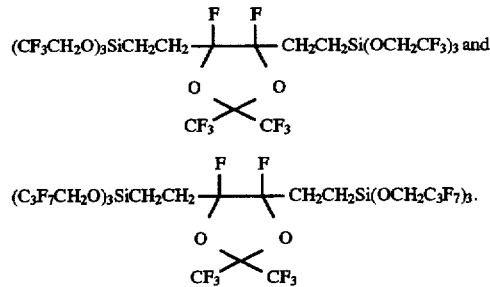

15. The fluoropolymer nanocomposite of claim 1 wherein the inorganic oxide precursor is an oligomeric compound selected from the group consisting of: an oligomeric compound having the formula

(VII)

wherein:

z is a number from about 0.5 to about 3.0;

a is an integer from 1 to about 10; and

R$_f$ has up to about 18 carbon atoms and is selected from the group consisting of:
  (a) C₁ to about C₁₈ perfluoroalkyl;
  (b) —[CF₂CF(CF₃)O]$_r$—CF₂—CF₂—CF₃, wherein r is an integer of at least 1;
  (c) —CF₂—(CF₂—O)$_q$—CF₃, wherein q is an integer of at least 2; and
  (d) —CH₂—C(CF₃)₂—CF₂—CF₂—CF₃;

each R$_f$ optionally substituted with one or more hydrogen;

an oligomeric compound having the formula:

(VIII)

wherein:

z is a number from about 0.5 to about 3.0;

y is an integer from 2 to about 10;

each R¹⁴ is independently C₁ to about C₈ alkyl, C₁ to about C₁₀ carboxy, C₁ to about C₁₀ fluorocarboxy or C$_a$H$_{2a}$R$_f$;

a is an integer from 1 to about 10; and

R$_f$ has up to about 18 carbon atoms and is selected from the group consisting of:
  (a) C₁ to about C₁₈ perfluoroalkyl;
  (b) —[CF₂CF(CF₃)O]$_r$—CF₂—CF₂—CF₃, wherein r is an integer of at least 1;
  (c) —CF₂—(CF₂—O)$_q$—CF₃, wherein q is an integer of at least 2; and
  (d) —CH₂—C(CF₃)₂—CF₂—CF₂—CF₃;

each R$_f$ optionally substituted with one or more hydrogen;

an oligomeric compound having the formula:

(IX)

wherein:

z is a number from about 0.5 to about 3.0;

each R¹⁴ is independently C₁ to about C₈ alkyl, C₁ to about C₁₀ carboxy, C₁ to about C₁₀ fluorocarboxy or C$_a$H$_{2a}$R$_f$;

a is an integer from 1 to about 10;

Ar is a divalent aromatic radical; and

R$_f$ has up to about 18 carbon atoms and is selected from the group consisting of:
  (a) C₁ to about C₁₈ perfluoroalkyl;

(b) —[CF$_2$CF(CF$_3$)O]$_r$—CF$_2$—CF$_2$—CF$_3$, wherein r is an integer of at least 1;

(c) —CF$_2$—(CF$_2$—O)$_q$—CF$_3$, wherein q is an integer of at least 2; and (d) —CH$_2$—C(CF$_3$)$_2$—CF$_2$—CF$_2$—CF$_3$;

each R$_f$ optionally substituted with one or more hydrogen.

16. The fluoropolymer nanocomposite of claim 1 wherein the fluoropolymer is selected from the group consisting of: polytetrafluoroethylene; a copolymer derived from tetrafluoroethylene and hexafluoropropylene; a copolymer derived from tetrafluoroethylene and perfluoromethylvinylether; a copolymer derived from tetrafluoroethylene and at least one perfluoroalkylvinylether; a copolymer derived from tetrafluoroethylene and 2,2-bis(trifluoromethyl)-4,5-difluoro-1,3-dioxole; and a copolymer derived from tetrafluoroethylene and hexafluoropropylene oxide.

17. The fluoropolymer nanocomposite of claim 16 wherein the fluoropolymer is the copolymer derived from tetrafluoroethylene and hexafluoropropylene or a copolymer derived from tetrafluoroethylene and 2,2-bis(trifluoromethyl)-4,5-difluoro-1,3-dioxole.

18. A process for the preparation of a fluoropolymer nanocomposite comprising (a) a fluoropolymer phase comprising at least one fluoropolymer; and (b) a partially or fully cross-linked inorganic oxide phase prepared from at least one inorganic oxide precursor, said inorganic oxide phase being dispersed within said fluoropolymer phase and exhibiting no particles or substantially all particles having a particle size of less than about 75 nm; comprising:

(a) contacting at least one fluoropolymer soluble in a fluorinated solvent with at least one inorganic oxide precursor soluble in the fluorinated solvent and an optional gelling agent in the presence of the fluorinated solvent to form a solution;

(b) allowing the inorganic oxide precursor to partially or fully cross-link to form an inorganic oxide phase dispersed within a fluoropolymer phase; and (c) optionally, isolating the fluoropolymer nanocomposite.

19. The process of claim 18 wherein the fluorinated solvent is selected from the group consisting of: perfluoro(butyl THF), a mixture of perfluorotrialkylamines, C$_3$F$_7$OCHFCF$_3$, hexafluorobenzene, perfluorophenanthrene, perfluoromethylcyclohexane, and perfluoro(n-ethylmorpholine).

20. The process of claim 18 wherein the gelling agent is selected from the group consisting of: trifluoroacetic acid, perfluoropropionic acid, and trifluoromethanesulfonic acid.

21. The process of claim 18 wherein the gelling agent is formic acid in tetrahydrofuran or in methylene chloride and the gelling agent is contacted within the inorganic oxide precursor prior to contact with the fluoropolymer and fluorinated solvent.

22. A coating composition, comprising a fluoropolymer nanocomposite, said fluoropolymer nanocomposite comprising, a fluoropolymer phase comprising at least one fluoropolymer, and at least one partially or fully cross-linked inorganic oxide phase prepared from at least one inorganic oxide precursor, said inorganic oxide phase being dispersed within said fluoropolymer phase, said inorganic oxide phase exhibiting either no particles or substantially all particles present in the inorganic oxide phase having a particle size of less than about 75 nm, the fluoropolymer and the inorganic oxide precursor being soluble in a fluorinated solvent.

23. A coated substrate wherein the coating comprises a fluoropolymer nanocomposite, said fluoropolymer nanocomposite comprising, a fluoropolymer phase comprising at least one fluoropolymer, and at least one partially or fully cross-linked inorganic oxide phase prepared from at least one inorganic oxide precursor, said inorganic oxide phase being dispersed within said fluoropolymer phase, said inorganic oxide phase exhibiting either no particles or substantially all particles present in the inorganic oxide phase having a particle size of less than about 75 nm, the fluoropolymer and the inorganic oxide precursor being soluble in a fluorinated solvent.

24. The coated substrate of claim 23 wherein the substrate is selected from the group consisting of: glass, ceramic, plastic, rubber, elastomer, wood and metal.

25. A coated substrate wherein the coating is a multilayer coating comprising:

a primer, a top coat, and optionally one or more intermediate coats between the primer and the topcoat, wherein the topcoat is a fluoropolymer and the primer is a coating comprising, a fluoropolymer nanocomposite, said fluoropolymer nanocomposite comprising, a fluoropolymer phase comprising at least one fluoropolymer, and at least one partially or fully cross-linked inorganic oxide phase prepared from at least one inorganic oxide precursor, said inorganic oxide phase being dispersed within said fluoropolymer phase, said inorganic oxide phase exhibiting either no particles or substantially all particles present in the inorganic oxide phase having a particle size of less than about 75 nm, the fluoropolymer and the inorganic oxide precursor being soluble in a fluorinated solvent.

26. The coated substrate of claim 25 wherein the substrate is selected from the group consisting of: glass, ceramic, plastic, rubber, elastomer, wood and metal.

27. The coated substrate of claim 25 wherein the topcoat is a co-polymer derived from tetrafluoroethylene and bis 2,2-(trifluoromethyl)-4,5-difluoro-1,3-dioxole.

28. The coated substrate of claim 25 wherein the topcoat is a co-polymer derived from tetrafluoroethylene and hexafluoropropylene.

29. The coated substrate of claim 25 wherein the topcoat is a co-polymer derived from tetrafluoroethylene and at least one perfluoroalkylvinylether.

30. An anti-reflective coating for an optoelectronic display device, comprising: a fluoropolymer nanocomposite, said fluoropolymer nanocomposite comprising, a fluoropolymer phase comprising at least one fluoropolymer, and at least one partially or fully cross-linked inorganic oxide phase prepared from at least one inorganic oxide precursor, said inorganic oxide phase being dispersed within said fluoropolymer phase, said inorganic oxide phase exhibiting either no particles or substantially all particles present in the inorganic oxide phase having a particle size of less than about 75 nm, the fluoropolymer and the inorganic oxide precursor being soluble in a fluorinated solvent.

31. The anti-reflective coating of claim 30 wherein the fluoropolymer is a co-polymer derived from tetrafluoroethylene and bis-2,2-(trifluoromethyl)-4,5-difluoro-1,3-dioxole.

32. The anti-reflective coating of claim 30 wherein the fluoropolymer is a copolymer derived from tetrafluoroethylene and at least one perfluoroalkylvinylether.

33. An interlayer dielectric coating having improved dimensional stability and improved bonding to metal top coats after thermal cycling, comprising: a fluoropolymer nanocomposite, said fluoropolymer nanocomposite comprising, a fluoropolymer phase comprising at least one fluoropolymer, and at least one partially or fully cross-linked inorganic oxide phase prepared from at least one inorganic oxide precursor, said inorganic oxide phase being dispersed within said fluoropolymer phase, said inorganic oxide phase exhibiting either no particles or substantially all particles present in the inorganic oxide phase having a particle size of less than about 75 nm, the fluoropolymer and the inorganic oxide precursor being soluble in a fluorinated solvent.

34. The interlayer dielectric coating of claim 33 wherein the fluoropolymer is a co-polymer derived from tetrafluoroethylene and bis-2,2-(trifluoromethyl)-4,5-difluoro-1,3-dioxole.

35. The interlayer dielectric coating of claim 33 wherein the fluoropolymer is a co-polymer derived from tetrafluoroethylene and at least one perfluoroalkylvinylether.

36. An article of cookware comprising a metal substrate coated with a scratch-resistant, non-stick coating system wherein said coating system comprises a primer applied to a metal substrate and a topcoat adhered to said primer, said primer comprising: a fluoropolymer nanocomposite, said fluoropolymer nanocomposite comprising, a fluoropolymer phase comprising at least one fluoropolymer, and at least one partially or fully cross-linked inorganic oxide phase prepared from at least one inorganic oxide precursor, said inorganic oxide phase being dispersed within said fluoropolymer phase, said inorganic oxide phase exhibiting either no particles or substantially all particles present in the inorganic oxide phase having a particle size of less than about 75 nm, the fluoropolymer and the inorganic oxide precursor being soluble in a fluorinated solvent; and said topcoat comprising a copolymer derived from tetrafluoroethylene and 2,2-bis(trifluoromethyl)-4,5-difluoro-1,3-dioxole.

37. The article of claim 36 wherein the fluoropolymer is a co-polymer derived from tetrafluoroethylene and bis-2,2-(trifluoromethyl)-4,5-difluoro-1,3-dioxole.

38. The article of claim 36 wherein the fluoropolymer is a co-polymer derived from tetrafluoroethylene and at least one perfluoroalkylvinylether.

39. An article of cookware comprising a metal substrate coated with a scratch-resistant, non-stick coating system wherein said coating system comprises a primer applied to a metal substrate and a topcoat adhered to said primer, said primer comprising: a fluoropolymer nanocomposite, said fluoropolymer nanocomposite comprising, a fluoropolymer phase comprising at least one fluoropolymer, and at least one partially or fully cross-linked inorganic oxide phase prepared from at least one inorganic oxide precursor, said inorganic oxide phase being dispersed within said fluoropolymer phase, said inorganic oxide phase exhibiting either no particles or substantially all particles present in the inorganic oxide phase having a particle size of less than about 75 nm, the fluoropolymer and the inorganic oxide precursor being soluble in a fluorinated solvent; and said topcoat comprising a copolymer derived from tetrafluoroethylene and hexafluoropropylene.

40. The cookware of claim 39 wherein the fluoropolymer is a copolymer derived from tetrafluoroethylene and at least one perfluoroalkylvinylether.

* * * * *